US012719583B2

(12) United States Patent
Sato et al.

(10) Patent No.: US 12,719,583 B2
(45) Date of Patent: Aug. 25, 2026

(54) SIGNAL PROCESSING APPARATUS, OPTICAL TRANSMITTING APPARATUS, OPTICAL RECEIVING APPARATUS, OPTICAL TRANSMISSION SYSTEM, AND SIGNAL PROCESSING METHOD

(71) Applicant: NEC Corporation, Tokyo (JP)

(72) Inventors: Masaki Sato, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 854 days.

(21) Appl. No.: 18/017,224

(22) PCT Filed: Jul. 30, 2020

(86) PCT No.: PCT/JP2020/029231

§ 371 (c)(1),
(2) Date: Jan. 20, 2023

(87) PCT Pub. No.: WO2022/024292

PCT Pub. Date: Feb. 3, 2022

(65) Prior Publication Data

US 2023/0275674 A1 Aug. 31, 2023

(51) Int. Cl.
*H04B 10/61* (2013.01)
*H04L 27/26* (2006.01)

(52) U.S. Cl.
CPC ... *H04B 10/6165* (2013.01); *H04L 27/26526* (2021.01)

(58) Field of Classification Search
None
See application file for complete search history.

(56) References Cited

U.S. PATENT DOCUMENTS

2002/0178417 A1 11/2002 Jacob et al.
2008/0260044 A1 10/2008 Yun et al.
2013/0071105 A1* 3/2013 Chang ................. H04B 7/0413 398/43
2015/0110216 A1 4/2015 Bajcsy et al.
2016/0219559 A1 7/2016 Sohn et al.
(Continued)

FOREIGN PATENT DOCUMENTS

JP 2019-097211 A 6/2019
WO 2015/072089 A1 5/2015

OTHER PUBLICATIONS

Japanese Office Action for JP Application No. 2022-539895 mailed on Dec. 5, 2023 with English Translation.
(Continued)

*Primary Examiner* — David W Lambert
(74) *Attorney, Agent, or Firm* — Sughrue Mion, PLLC

(57) ABSTRACT

A signal processing apparatus (10) according to the present disclosure includes: an overlap-type FFT processing unit (11) that performs FFT processing overlapping input subcarrier signals each other for each of FFT blocks, and a generation unit (12) that generates a signal which is obtained by frequency shifting the subcarrier signals that have been subjected to the FFT processing by the overlap-type FFT processing unit (11) by a frequency shift amount of a subcarrier, a phase offset that occurs between the FFT blocks overlapping each other being compensated in the signal.

17 Claims, 24 Drawing Sheets

(56) References Cited

U.S. PATENT DOCUMENTS

2016/0285562 A1* 9/2016 Ogasahara ......... H04B 10/0795
2019/0280910 A1* 9/2019 Sun ........................ H03H 17/06

OTHER PUBLICATIONS

International Search Report for PCT Application No. PCT/JP2020/029231, mailed on Oct. 27, 2020.
Takahiro Okano et al., "Impact of Overlap FFT Filter Bank on Transmission Performance in Overlap-Windowed-DFTs-OFDM", vol. 118, No. 311, IEICE Technical Report, Nov. 21, 2018, pp. 85-90.
Akira Saito et al., "A novel overlap FFT filter-bank with variable overlap length for flexible spectrum access", vol. 116, No. 409, IEICE Technical Report, Jan. 19-20, 2017, pp. 17-22.
Jin Wei, "Modification of Frequency Estimation Algorithms for Sinusoidal Signals Based on Phase Difference of Overlap FFT", 2008 International Conference on Communications, Circuits and Systems, May 25-27, 2008, pp. 927-929.
Wang, Sichun et al., "Probability Density of the Phase Error of a Digital Interferometer with Overlapped FFT Processing", 2010 53rd IEEE International Midwest Symposium on Circuits and Systems. Aug. 1-4, 2010, pp. 849-852.

* cited by examiner 1
100
OPTICAL TRANSMITTER
110
TRANSMITTER-SIDE DSP
111
ENCODING UNIT
XI
XQ
YI
YQ
112
TRANSMITTER-SIDE DIGITAL SIGNAL PROCESSING UNIT
DAC
113-1
113-2
113-3
113-4
120
OPTICAL TRANSMITTING FRONT END CIRCUIT
121
LASER LIGHT SOURCE
122-1
122-2
122-3
122-4
MZM
123-1
123-2
123-3
123-4
124
POLARIZATION MULTIPLEXING UNIT
300
SINGLE CARRIER
X POLAR-IZATION
Y POLAR-IZATION
0
1

1
200
220
222
300
OPTICAL RECEIVER
210
OPTICAL RECEIVING FRONT END CIRCUIT
221
LASER LIGHT SOURCE
223-1
POLARIZATION DEMULTIPLEXING UNIT
90-DEGREE HYBRID CIRCUIT
90-DEGREE HYBRID CIRCUIT
223-2
224-1
224-2
224-3
224-4
RECEIVER-SIDE DSP
211-1
211-2
211-3
211-4
ADC
XI
XQ
YI
YQ
212
213
214
RECEIVER-SIDE DIGITAL SIGNAL PROCESSING UNIT
ERROR CORRECTION UNIT
DIGITAL SIGNAL REPRODUCING UNIT
SINGLE CARRIER
Q
I
X POLAR-IZATION
Y POLAR-IZATION 112
404
IFFT UNIT
D15
403
TRANSMITTER-SIDE SUBCARRIER ARRANGEMENT UNIT
D14'
408
PHASE COMPENSATION UNIT
D13'SC1
D13'SC2
D13'SCm
D13SC1
D13SC2
D13SCm
402-1
402-2
402-m
FFT UNIT
FFT UNIT
FFT UNIT
D12SC1
D12SC2
D12SCm
401
TRANSMITTER-SIDE SUBCARRIER DEMULTIPLEXING UNIT
D11
409
FFT PARAMETER SETTING UNIT
407
PHASE OFFSET COMPUTATION UNIT
405
FREQUENCY SHIFT SETTING UNIT

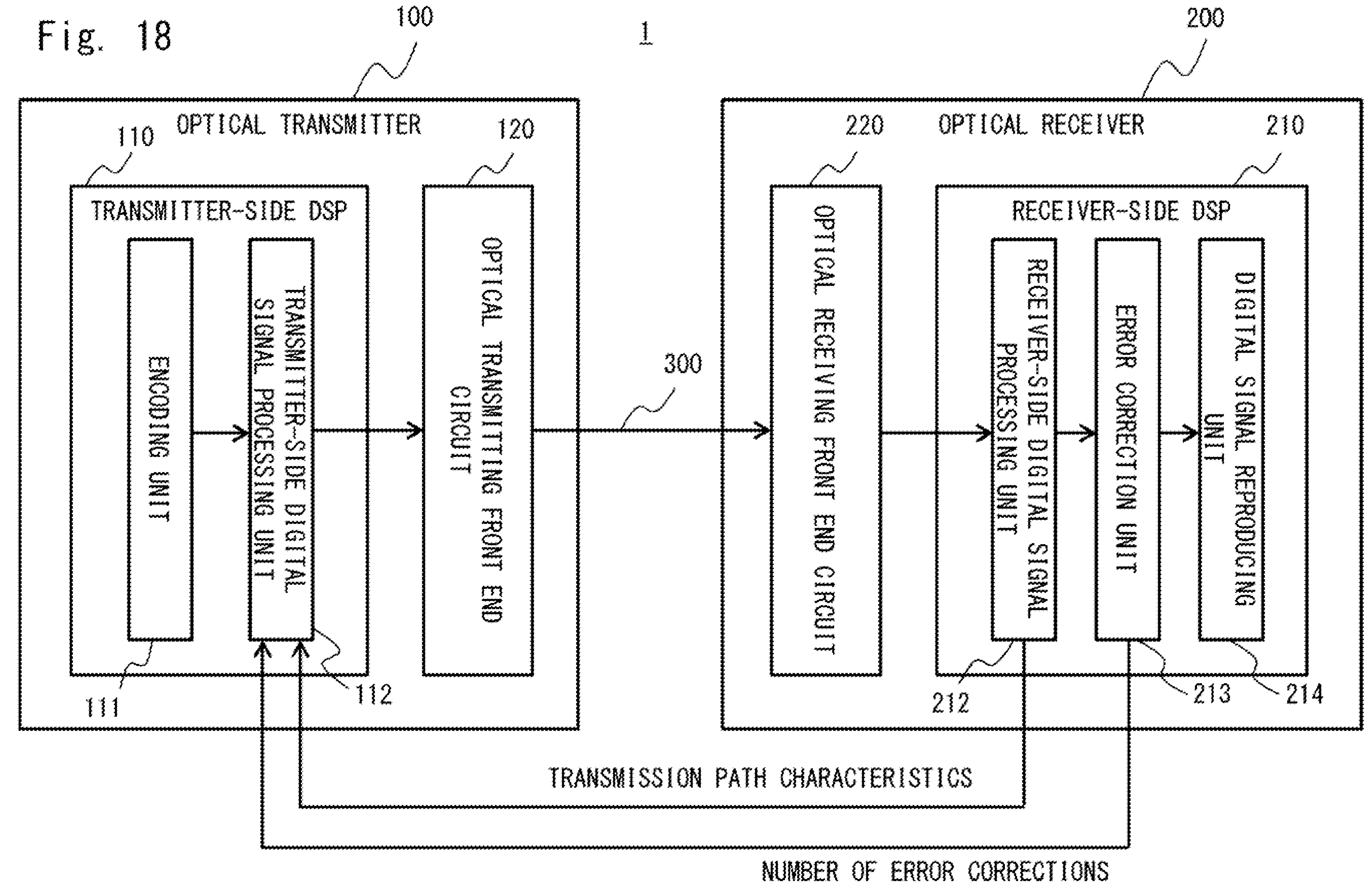
Fig. 18
100
1
200
OPTICAL TRANSMITTER
110
120
TRANSMITTER-SIDE DSP
ENCODING UNIT
TRANSMITTER-SIDE DIGITAL SIGNAL PROCESSING UNIT
OPTICAL TRANSMITTING FRONT END CIRCUIT
111
112
300
OPTICAL RECEIVER
220
210
RECEIVER-SIDE DSP
OPTICAL RECEIVING FRONT END CIRCUIT
RECEIVER-SIDE DIGITAL SIGNAL PROCESSING UNIT
ERROR CORRECTION UNIT
DIGITAL SIGNAL REPRODUCING UNIT
212
213
214
TRANSMISSION PATH CHARACTERISTICS
NUMBER OF ERROR CORRECTIONS 112
401
TRANSMITTER-SIDE SUBCARRIER DEMULTIPLEXING UNIT
D11
D12SC1
D12SC2
D12SCm
402-1
402-2
402-m
FFT UNIT
FFT UNIT
FFT UNIT
D13SC1
D13SC2
D13SCm
408
PHASE COMPENSATION UNIT
D13' SC1
D13' SC2
D13' SCm
403
TRANSMITTER-SIDE SUBCARRIER ARRANGEMENT UNIT
D14'
404
IFFT UNIT
D15
406
FFT PARAMETER ACQUISITION UNIT
410
SUBCARRIER SPACING ADJUSTMENT UNIT
405
FREQUENCY SHIFT SETTING UNIT
407
PHASE OFFSET COMPUTATION UNIT

SIGNAL PROCESSING APPARATUS, OPTICAL TRANSMITTING APPARATUS, OPTICAL RECEIVING APPARATUS, OPTICAL TRANSMISSION SYSTEM, AND SIGNAL PROCESSING METHOD

This application is a National Stage Entry of PCT/JP2020/029231 filed on Jul. 30, 2020, the contents of all of which are incorporated herein by reference, in their entirety.

TECHNICAL FIELD

The present invention relates to a signal processing apparatus, an optical transmitting apparatus, an optical receiving apparatus, an optical transmission system, and a signal processing method.

BACKGROUND ART

In recent years, traffic of communication networks has abruptly increased, and a further increase in capacity of a communication system has been required. For example, in a trunk optical communication system, research has been advancing to implement a large capacity of over 1 Tera bit per second (Tbps). In this optical communication system, a digital coherent system in which an optical phase modulation system and a polarization multiplexing/demultiplexing technique are combined with each other is used.

As related art, for example, Patent Literature 1 is known. Patent Literature 1 discloses a technique for compensating frequency deviations in a digital coherent receiver.

CITATION LIST

Patent Literature

[Patent Literature 1] International Patent Publication No. WO 2015/072089

SUMMARY OF INVENTION

Technical Problem

In the optical transmission system of 1 Tbps or larger, when the transmission performance and the circuit size are taken into consideration, it is absolutely necessary to further apply a subcarrier (SC) multiplex system to the digital coherent system in which the optical phase modulation system and the polarization multiplexing/demultiplexing technique are combined with each other. By using the subcarrier multiplexing system, even when the transmission capacity per wavelength remains the same, performance degradation and a circuit load can be suppressed, whereby a large capacity can be achieved.

As a method for achieving subcarrier multiplexing or demultiplexing by digital signal processing in an optical transmission system, a method of using overlap-type Fast Fourier Transform (FFT) may be employed. However, when subcarrier multiplexing or demultiplexing is performed using the overlap-type FFT, a problem that a phase offset occurs in a subcarrier-multiplexed/demultiplexed signal.

The present disclosure has been made in view of the aforementioned problem and an aim of the present disclosure is to provide a signal processing apparatus, an optical transmitting apparatus, an optical receiving apparatus, an optical transmission system, and a signal processing method capable of preventing occurrence of a phase offset.

Solution to Problem

A signal processing apparatus according to the present disclosure includes: FFT processing means for performing FFT processing overlapping subcarrier signals each other for each of FFT blocks; and generation means for generating a signal obtained by frequency shifting the subcarrier signals that have been subjected to the FFT processing by a frequency shift amount of a subcarrier, a phase offset that occurs between the FFT blocks overlapping each other being compensated in the signal.

An optical transmitting apparatus according to the present disclosure includes: signal processing means for processing an input digital signal; and optical transmitting means for optically modulating the processed signal and transmitting the optical signal that has been optically modulated to an optical transmission line, and the signal processing means includes: FFT processing means for performing FFT processing overlapping subcarrier signals demultiplexed from the digital signal each other for each of FFT blocks; and generation means for generating a subcarrier arrangement signal obtained by frequency shifting the subcarrier signals that have been subjected to the FFT processing by a frequency shift amount of a subcarrier, a phase offset that occurs between the FFT blocks overlapping each other being compensated in the subcarrier arrangement signal.

An optical receiving apparatus according to the present disclosure includes: optical receiving means for receiving a subcarrier-multiplexed optical signal from an optical transmission line and photodetecting the received optical signal; and signal processing means for converting the photodetected signal into a digital signal and processing the converted digital signal, in which the signal processing means includes: FFT processing means for performing FFT processing overlapping the digital signal each other for each of FFT blocks; and generation means for generating subcarrier demultiplexing signals obtained by frequency shifting subcarrier signals included in the digital signal that has been subjected to the FFT processing by a frequency shift amount of a subcarrier, a phase offset that occurs between FFT blocks overlapping each other being compensated in the subcarrier demultiplexing signals.

An optical transmission system according to the present disclosure includes: an optical transmitting apparatus and an optical receiving apparatus connected to each other via an optical transmission line, in which the optical transmitting apparatus includes: signal processing means for processing an input digital signal; and optical transmitting means for optically modulating the processed signal and transmitting the optical signal that has been optically modulated to the optical transmission line, and the signal processing means includes: FFT processing means for performing FFT processing overlapping subcarrier signals demultiplexed from the digital signal each other for each of FFT blocks; and generation means for generating a subcarrier arrangement signal obtained by frequency shifting the subcarrier signals that have been subjected to the FFT processing by a frequency shift amount of a subcarrier, a phase offset that occurs between the FFT blocks overlapping each other being compensated in the subcarrier arrangement signal.

An optical transmission system according to the present disclosure includes: an optical transmitting apparatus and an optical receiving apparatus connected to each other via an optical transmission line, in which the optical receiving apparatus includes: optical receiving means for receiving a subcarrier-multiplexed optical signal from the optical transmission line and photodetecting the received optical signal; and signal processing means for converting the photodetected signal into a digital signal and processing the converted digital signal, and the signal processing means includes: FFT processing means for performing FFT processing overlapping the digital signal each other for each of FFT blocks; and generation means for generating subcarrier demultiplexing signals obtained by frequency shifting subcarrier signals included in the digital signal that has been subjected to the FFT processing by a frequency shift amount of a subcarrier, a phase offset that occurs between FFT blocks overlapping each other being compensated in the subcarrier demultiplexing signals.

A signal processing method according to the present disclosure includes: performing FFT processing overlapping subcarrier signals each other for each of FFT blocks; and generating a signal obtained by frequency shifting the subcarrier signals that have been subjected to the FFT processing by a frequency shift amount of a subcarrier, a phase offset that occurs between the FFT blocks overlapping each other being compensated in the signal.

Advantageous Effects of Invention

According to the present disclosure, it is possible to provide a signal processing apparatus, an optical transmitting apparatus, an optical receiving apparatus, an optical transmission system, and a signal processing method capable of preventing occurrence of a phase offset.

BRIEF DESCRIPTION OF DRAWINGS

FIG. 18 is a configuration diagram showing a configuration example of an optical transmission system according to a third example embodiment;

EXAMPLE EMBODIMENT

Hereinafter, with reference to the drawings, example embodiments will be described. Throughout the drawings, the same components are denoted by the same reference symbols and overlapping descriptions will be omitted as necessary. Note that the arrows added in configuration diagrams (block diagrams) are illustrations only for the explanation and are not intended to limit the types or the directions of signals.

Overview of Example Embodiments

Figure 1:
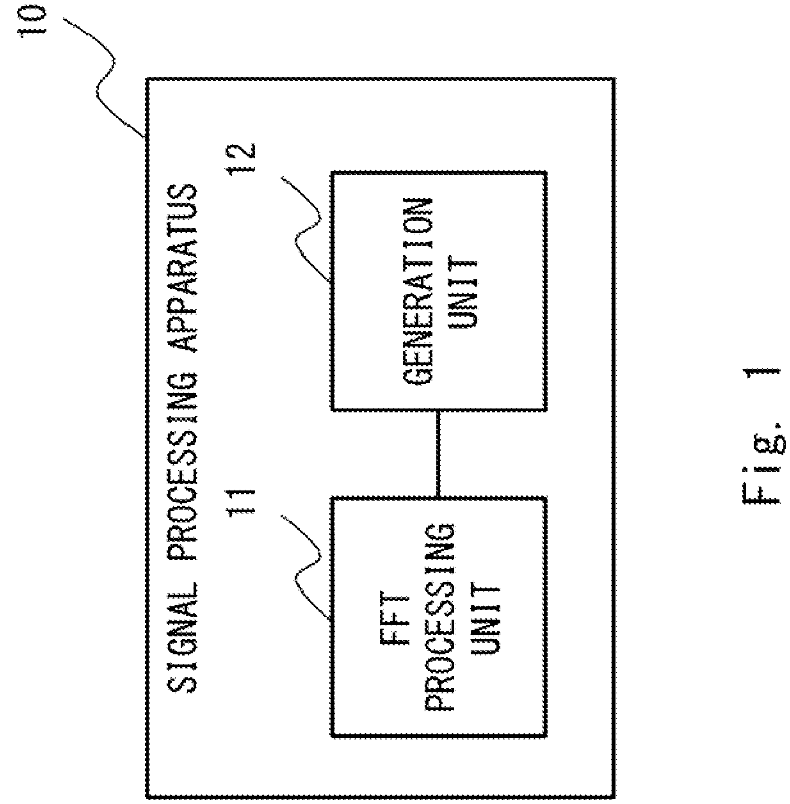
FIG. 1 is a configuration diagram showing an overview of a signal processing apparatus according to an example embodiment.
Figure 2:
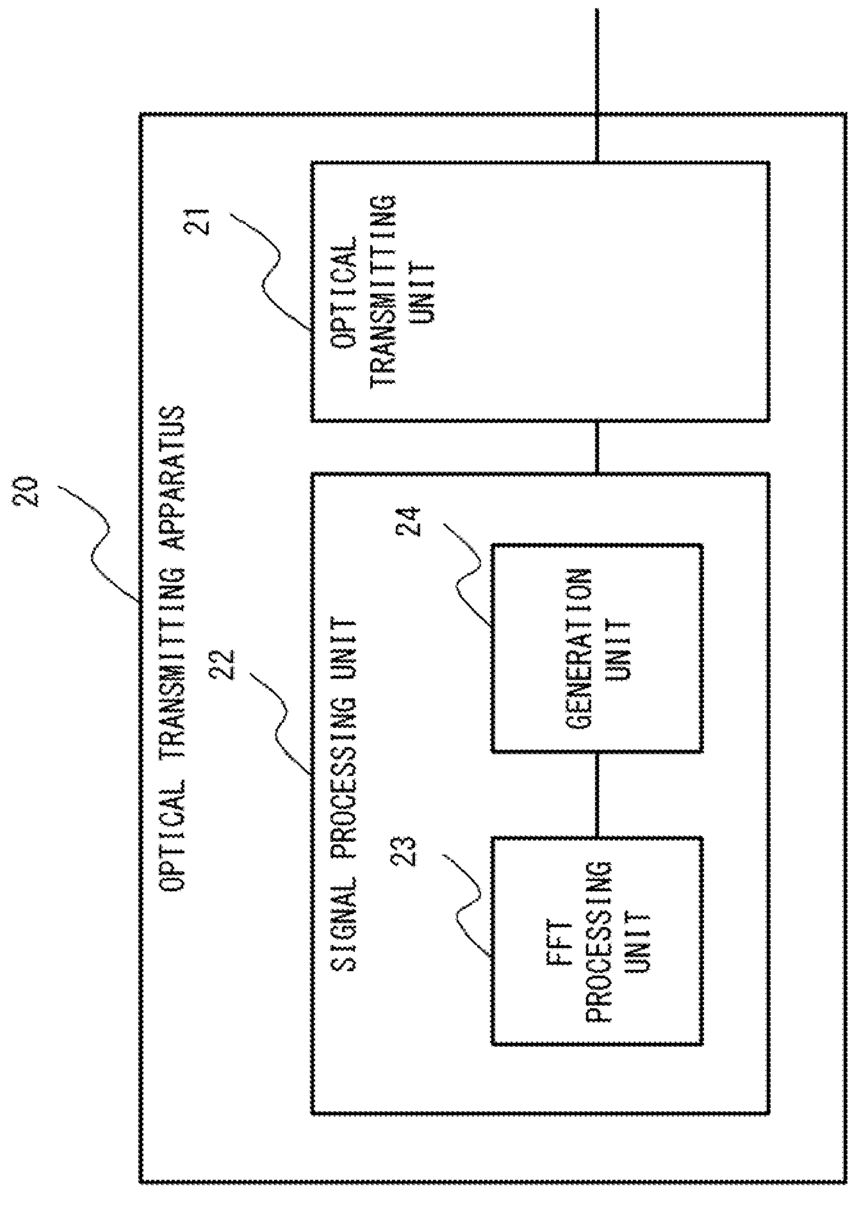
FIG. 2 is a configuration diagram showing an overview of an optical transmitting apparatus according to the example embodiment.
Figure 3:
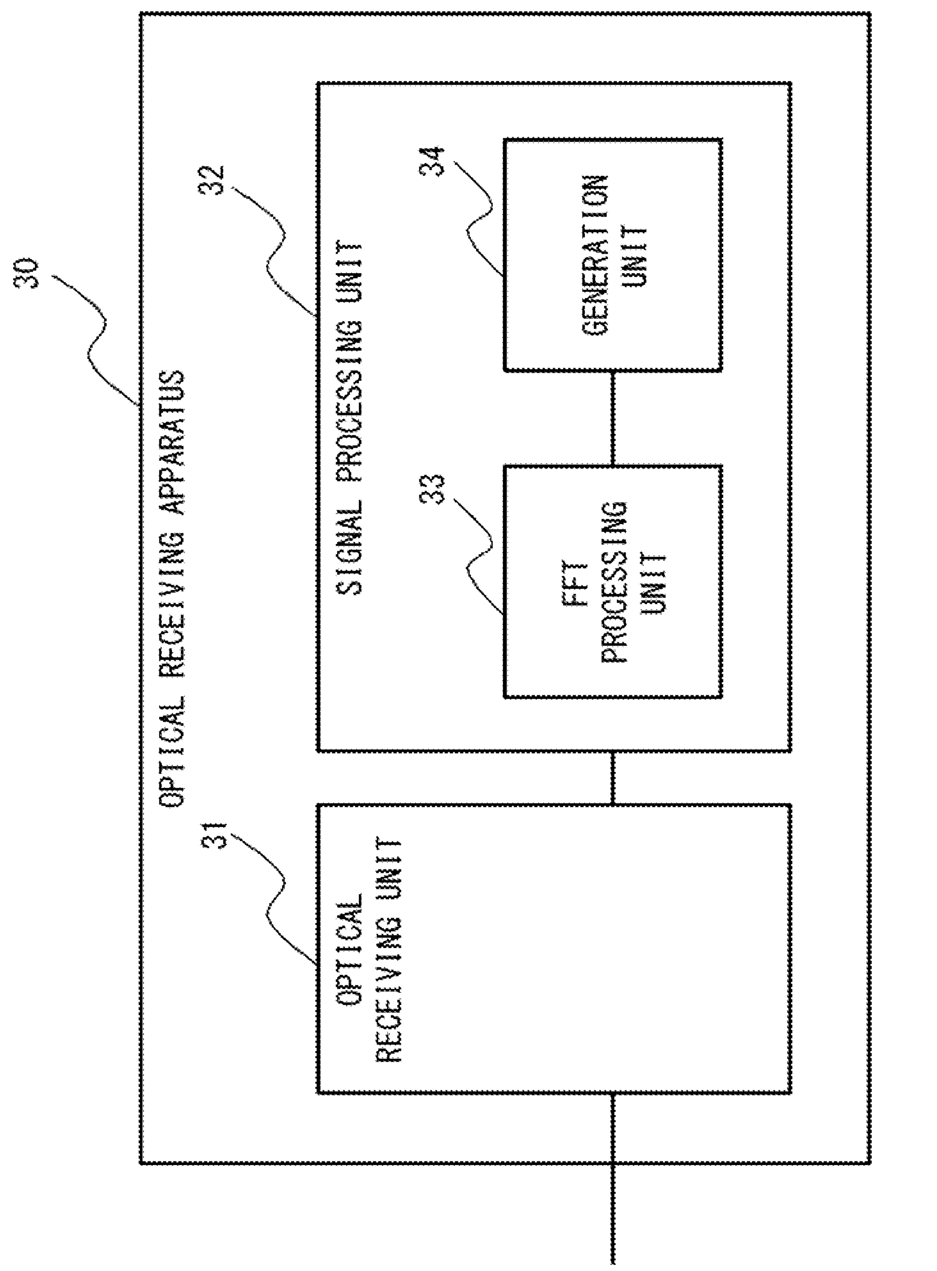
FIG. 3 is a configuration diagram showing an overview of an optical receiving apparatus according to the example embodiment.

FIG. 1 shows an overview of a signal processing apparatus according to an example embodiment, FIG. 2 shows an overview of an optical transmitting apparatus according to the example embodiment, and FIG. 3 shows an overview of an optical receiving apparatus according to the example embodiment. The optical transmitting apparatus shown in FIG. 2 and the optical receiving apparatus shown in FIG. 3, which are connected to each other via an optical transmission line in such a way that they can perform optical communications between them, form an optical transmission system.

As shown in FIG. 1, a signal processing apparatus 10 includes an FFT processing unit 11 and a generation unit 12. The FFT processing unit 11 causes subcarrier signals to overlap each other for each of the FFT blocks and performs FFT processing. The generation unit 12 generates a signal obtained by frequency-shifting the subcarrier signals that have been subjected to the FFT processing by the FFT processing unit 11 by a frequency shift amount of the subcarrier, a phase offset that occurs between the FFT blocks overlapping each other being compensated in the signal. For example, the generation unit 12 compensates for the phase offset that occurs when the frequency shift amount is a predetermined amount or when the frequency shift amount has changed for each of the FFT blocks.

As shown in FIG. 2, the optical transmitting apparatus 20 includes an optical transmitting unit 21 and a signal processing unit 22. The signal processing unit 22, which is a signal processing unit when the signal processing apparatus 10 shown in FIG. 1 is applied to the optical transmitting apparatus, processes the input digital signal. The optical transmitting unit 21 optically modulates the signal processed by the signal processing unit 22 and transmits the optically-modulated optical signal to an optical transmission line.

The signal processing unit 22 includes an FFT processing unit 23 and a generation unit 24. Like in the signal processing apparatus 10 shown in FIG. 1, the FFT processing unit 23 causes subcarrier signals demultiplexed from the input digital signal to overlap each other for each of the FFT blocks and performs FFT processing. The generation unit 24 generates a subcarrier arrangement signal obtained by frequency-shifting the subcarrier signals that have been subjected to the FFT processing by the FFT processing unit 23 by the frequency shift amount of the subcarrier, the phase offset that occurs between the FFT blocks overlapping each other being compensated in the subcarrier arrangement signal.

As shown in FIG. 3, the optical receiving apparatus 30 includes an optical receiving unit 31 and a signal processing unit 32. The optical receiving unit 31 receives the subcarrier-multiplexed optical signal from the optical transmission line, and photodetects the received optical signal. The signal processing unit 32, which is a signal processing unit when the signal processing apparatus 10 shown in FIG. 1 is applied, converts the photodetected signal into a digital signal and processes the converted digital signal.

The signal processing unit 32 includes an FFT processing unit 33 and a generation unit 34. Like the signal processing apparatus 10 shown in FIG. 1, the FFT processing unit 33 causes the subcarrier-multiplexed digital signal to overlap each other for each of the FFT blocks and performs FFT processing. The generation unit 34 generates subcarrier demultiplexing signals obtained by frequency-shifting the subcarrier signal included in the digital signal that has been subjected to the FFT processing by the FFT processing unit 33 by the frequency shift amount of the subcarrier, the phase offset that occurs between the FFT blocks overlapping each other being compensated in the subcarrier demultiplexing signals.

As described above, when the subcarrier signal is frequency-shifted using the overlap-type FFT in the transmitter-side subcarrier arrangement (multiplexing) or receiver-side subcarrier demultiplexing, a frequency shifting signal in which a phase offset that occurs between the FFT blocks that overlap each other is compensated is generated, whereby it is possible to reduce the occurrence of the phase offset.

First Example Embodiment

Figure 4:
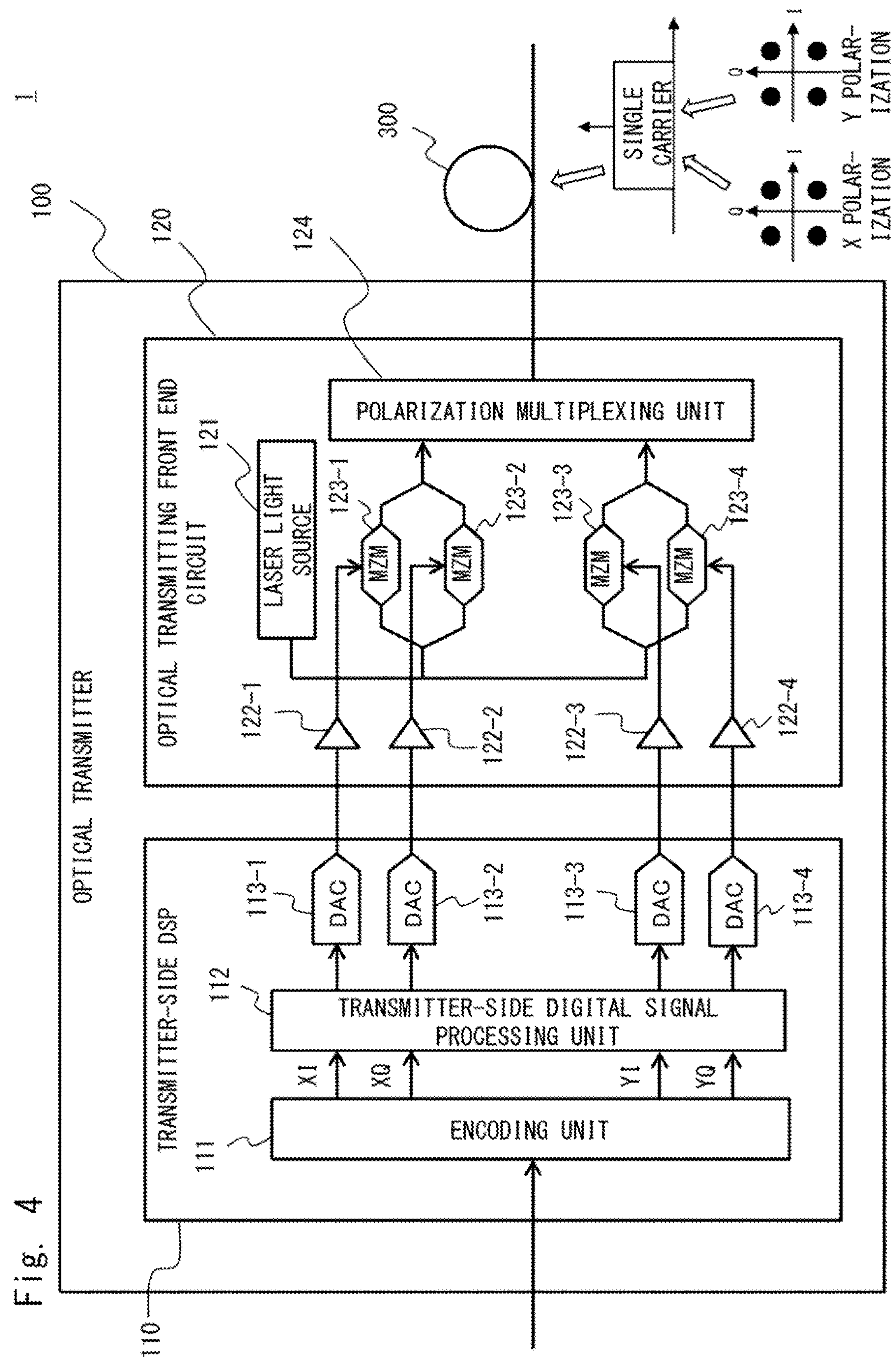
FIG. 4 is a configuration diagram showing a configuration example of an optical transmitter according to a first example embodiment.
Figure 5:
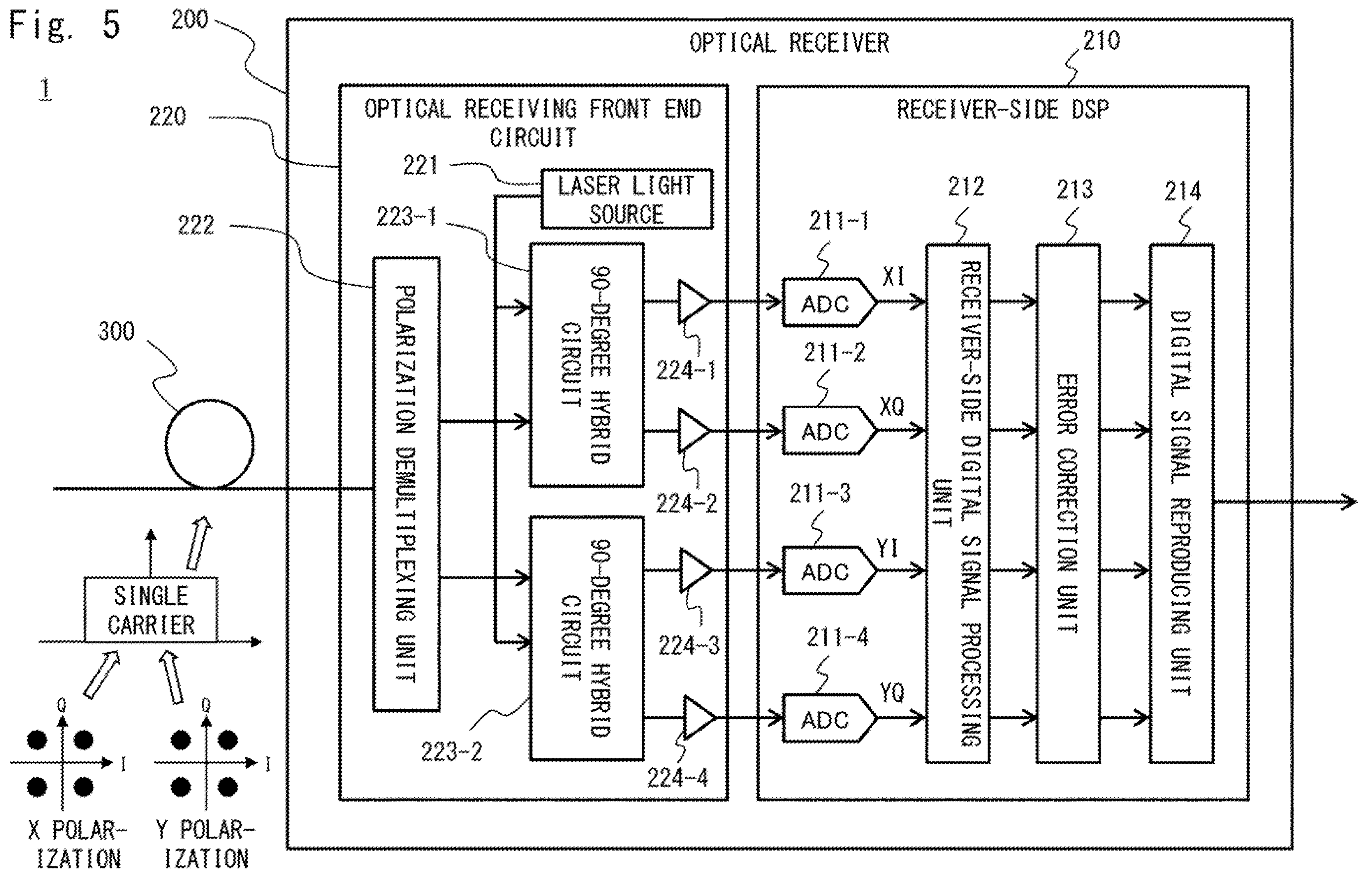
FIG. 5 is a configuration diagram showing a configuration example of an optical receiver according to the first example embodiment.

Hereinafter, with reference to the drawings, a first example embodiment will be described. FIG. 4 shows a configuration example of an optical transmitter according to this example embodiment and FIG. 5 shows a configuration example of an optical receiver according to this example embodiment. An optical transmitter 100 and an optical receiver 200 according to this example embodiment, which are connected to each other via an optical fiber transmission line 300 in such a way that they can perform optical communications between them, form an optical transmission system 1. For example, the optical transmission system 1 is a trunk wavelength multiplexing optical transmission system which uses a digital coherent system in which an optical phase modulation system and a polarization multiplexing/demultiplexing technique are combined with each other.

As shown in FIG. 4, the optical transmitter 100, which is a digital coherent optical transmitter (an optical transmitting apparatus), includes a transmitter-side Digital Signal Processor (DSP) 110 and an optical transmitting front end circuit 120. The transmitter-side DSP 110 encodes an input transmission digital signal (transmission bit string) and converts the encoded input transmission digital signal into a signal for performing optical modulation by the optical transmitting front end circuit 120. The transmitter-side DSP 110 includes an encoding unit 111, a transmitter-side digital signal processing unit 112, and Digital Analog Converters (DACs) 113-1 to 113-4.

The encoding unit 111 encodes the transmission digital signal to, for example, a signal for polarization multiplexing Quadrature Phase Shift Keying (QPSK) modulation. While a case in which the QPSK modulation signal is polarization-multiplexed will be described in this example embodiment, other than QPSK, multilevel modulation such as 16 Quadrature Amplitude Modulation (QAM), 32 QAM, or 64 QAM may be used. The encoding unit 111 performs error-correcting encoding processing on the transmission digital signal, and then maps the obtained signal into four-lane signals including an Inphase (I) component and a Quadrature (Q) component of X polarization, and an I component and a Q component of Y polarization. That is, the encoding unit 111 encodes the transmission digital signal and converts the encoded transmission digital signal into an XI signal of the I component of the X polarization, an XQ signal of the Q component of the X polarization, a YI signal of the I component of the Y polarization, and a YQ signal of the Q component of the Y polarization.

The transmitter-side digital signal processing unit 112 converts the four-lane digital signals encoded by the encoding unit 111 into subcarrier multiplexing signals (subcarrier arrangement signals) arranged in the frequencies of the plurality of subcarriers. The transmitter-side digital signal processing unit 112 converts the input digital signals into a signal for each subcarrier and frequency-shifts the frequency band of each signal by the frequency shift amount of the subcarrier, thereby performing subcarrier multiplexing (subcarrier arrangement).

The DACs 113-1 to 113-4 convert the digital subcarrier multiplexing signals generated by the transmitter-side digital signal processing unit 112 into analog subcarrier multiplexing signals. The DACs 113-1 to 113-4 generate the subcarrier-multiplexed analog XI signal, XQ signal, YI signal, and YQ signal, respectively, and output the generated signals to the optical transmitting front end circuit 120.

The optical transmitting front end circuit (optical transmitting unit) 120 optically-modulates and polarization-multiplexes the signals processed by the transmitter-side DSP 110, and transmits the generated optical signal to the optical receiver 200 via the optical fiber transmission line 300. The optical transmitting front end circuit 120 includes a laser light source 121, amplifiers 122-1 to 122-4, MZ modulators (MZMs: Mach-Zehnder Modulators) 123-1 to 123-4, and a polarization multiplexing unit 124.

The laser light source 121 generates a light source at a carrier frequency and inputs the generated light source to the MZ modulators 123-1 to 123-4. The amplifiers 122-1 to 122-4 amplify the XI signal, the XQ signal, the YI signal, and the YQ signal after the subcarrier multiplexing output from the transmitter-side DSP 110 and drive the MZ modulators 123-1 to 123-4, respectively.

The MZ modulators 123-1 to 123-4 are IQ optical modulators that perform IQ modulation on the light source of the laser light source 121 in accordance with the XI signal, the XQ signal, the YI signal, and the YQ signal. The MZ modulators 123-1 and 123-2 generate an IQ-modulated optical signal of the X polarization based on the XI signal and the XQ signal via the amplifiers 122-1 and 122-2. The MZ modulators 123-3 and 123-4 generate an IQ-modulated optical signal of the Y polarization based on the YI signal and the YQ signal via the amplifiers 122-3 and 122-4. The polarization multiplexing unit 124 polarization-multiplexes the IQ-modulated optical signal of the X polarization and the IQ-modulated optical signal of the Y polarization that have been generated, and transmits the multiplexed optical signal to the optical fiber transmission line 300. Accordingly, the subcarrier-multiplexed, phase-modulated, and polarization-multiplexed optical signal is propagated on the single carrier.

As shown in FIG. 5, the optical receiver 200 is a digital coherent optical receiver (optical receiving apparatus) and includes a receiver-side DSP 210 and an optical receiving front end circuit 220. The optical receiving front end circuit (optical receiving unit) 220 receives an optical signal from the optical fiber transmission line 300 and performs coherent detection. The optical receiving front end circuit 220 includes a laser light source 221, a polarization demultiplexing unit 222, 90-degree hybrid circuits 223-1 and 223-2, and amplifiers 224-1 to 224-4.

The laser light source 221 generates a local oscillation light having a frequency the same as that of the laser light source 121 on the transmitter-side and inputs the generated local oscillation light into the 90-degree hybrid circuits 223-1 and 223-2. The polarization demultiplexing unit 222 receives an optical signal after the polarization multiplexing transmitted from the optical transmitter 100 via the optical fiber transmission line 300 and polarization-demultiplexes the received optical signal into X polarization and Y polarization.

The 90-degree hybrid circuits 223-1 and 223-2 are coherent optical detectors that cause optical signals that have been polarization-demultiplexed by the polarization demultiplexing unit 222 and a local oscillation light of the laser light source 221 to interfere with each other to perform coherent detection and then convert the obtained signal into four-lane analog electric signals. The 90-degree hybrid circuit 223-1 demultiplexes X polarization of the received optical signal into an I component and a Q component, performs photoelectric conversion, and thus generates an XI signal and an XQ signal. The 90-degree hybrid circuit 223-2 demultiplexes the Y polarization of the received optical signal into an I component and a Q component, then performs photoelectric conversion, and thus generates a YI signal and a YQ signal. The amplifiers 224-1 to 224-4 amplify each of the XI signal, the XQ signal, the YI signal, and the YQ signal that have been generated and output them to the receiver-side DSP 210.

The receiver-side DSP 210 converts a signal coherently detected by the optical receiving front end circuit 220 into a digital signal and decodes the converted digital signal. The receiver-side DSP 210 includes Analog Digital Converters (ADCs) 211-1 to 211-4, a receiver-side digital signal processing unit 212, an error correction unit 213, and a digital signal reproducing unit 214. The ADCs 211-1 to 211-4 convert each of the analog XI signal, XQ signal, YI signal, and YQ signal amplified by the amplifiers 224-1 to 224-4 into digital signals.

The receiver-side digital signal processing unit 212 performs compensation of waveform distortion of the four-lane digital signals generated by the ADCs 211-1 to 211-4 and signal equalization processing, subcarrier-demultiplexes the subcarrier-multiplexed digital signals, and converts the subcarrier-demultiplexed signals into digital XI signal, XQ signal, YI signal, and YQ signal for decoding. The receiver-side digital signal processing unit 212 performs subcarrier multiplexing by frequency-shifting the frequency band of the input digital signal (subcarrier multiplexing signal) by the frequency shift amount of each subcarrier, and converts the demultiplexed subcarrier signals into digital signals for decoding.

The error correction unit 213 performs error correction processing on the four-lane digital signals for decoding generated by the receiver-side digital signal processing unit 212. The digital signal reproducing unit 214 demaps the four-lane digital signals error-corrected by the error correction unit 213 and decodes the obtained signals, thereby reproducing the received digital signals (received bit string).

Transmitter-Side Digital Signal Processing Unit According to Basic Example

A transmitter-side digital signal processing unit and a receiver-side digital signal processing unit according to a basic example before this example embodiment is applied will be described.

Figure 6:
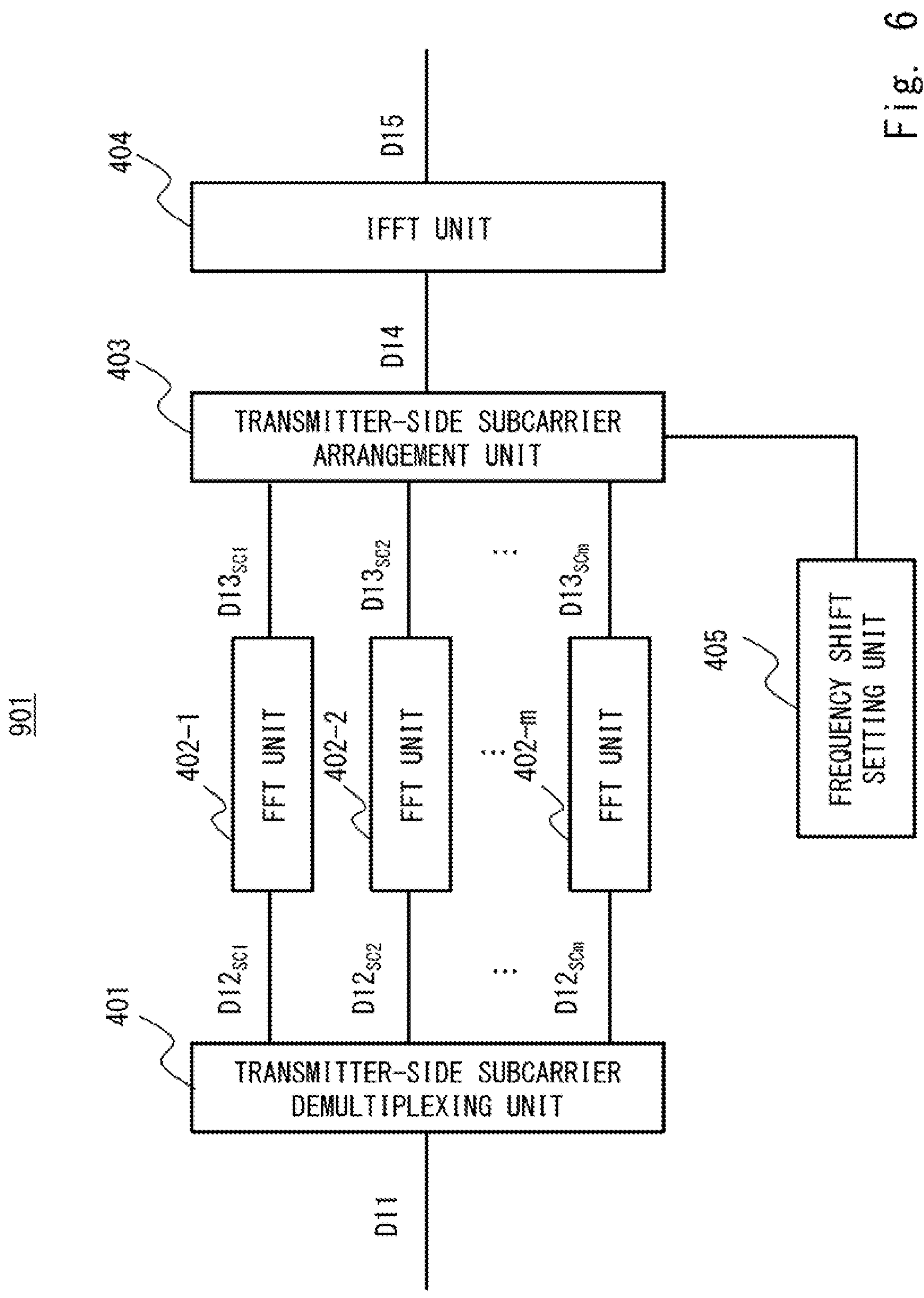
FIG. 6 is a configuration diagram showing a configuration of a transmitter-side digital signal processing unit according to a basic example.

FIG. 6 shows a configuration of the transmitter-side digital signal processing unit according to the basic example. As shown in FIG. 6, a transmitter-side digital signal processing unit 901 according to the basic example includes a transmitter-side subcarrier demultiplexing unit 401, FFT units 402-1 to 402-*m* (m denotes the number of subcarriers), a transmitter-side subcarrier arrangement unit 403, an Inverse Fast Fourier Transform (IFFT) unit 404, and a frequency shift setting unit 405.

The transmitter-side subcarrier demultiplexing unit 401 demultiplexes the input digital signal D11 into subcarrier signals $D12_{SC1}$ to $D12_{SCm}$ of each subcarrier. The input digital signal D11 is, for example, a signal encoded by the encoding unit 111. The digital signal D11 may correspond to one of the XI signal, the XQ signal, the YI signal, and the YQ signal that have been encoded or may correspond to some of the XI signal, the XQ signal, the YI signal, and the YQ signal. For example, the transmitter-side subcarrier demultiplexing unit 401 may convert the digital signal D11 into subcarrier signals $D12_{SC1}$ to $D12_{SCm}$ by serial-parallel conversion or demultiplex the digital signal D11 into the subcarrier signals $D12_{SC1}$ to $D12_{SCm}$ in accordance with the frame configuration. Note that the encoding unit 111 may be provided in place of the transmitter-side subcarrier demultiplexing unit 401 and the encoded subcarrier signals may be input to the transmitter-side digital signal processing unit.

The FFT units (FFT processing units) 402-1 to 402-*m* respectively perform FFT processing on the subcarrier signals $D12_{SC1}$ to $D12_{SCm}$ and convert the obtained signals into subcarrier FFT signals $D13_{SC1}$ to $D13_{SCm}$ in the frequency domain. The FFT unit 402 is an overlap-type FFT unit that causes input signals to overlap each other for each of the FFT blocks and performs FFT processing, and performs FFT processing by a predetermined FFT block size and an overlap size. The overlap-type FFT may be referred to as an overlap FFT.

The transmitter-side subcarrier arrangement unit 403 frequency-shifts the subcarrier FFT signals D13$_{SC1}$ to D13$_{SCm}$ in the frequency domain by the frequency shift amount of each subcarrier and generates a subcarrier arrangement signal D14 in which the frequency-shifted signals are arranged in a frequency domain. The transmitter-side subcarrier arrangement unit 403 is also a frequency shifting unit that frequency-shifts the FFT-processed subcarrier signals by a frequency shift amount. The frequency shift setting unit 405 sets the frequency shift amount of each subcarrier for the transmitter-side subcarrier arrangement unit 403.

The IFFT unit (IFFT processing unit) 404 performs IFFT processing on the subcarrier arrangement signal D14 in the frequency domain and converts the obtained signal into a subcarrier multiplexing signal D15 in the time domain. The IFFT unit 404 outputs the converted subcarrier multiplexing signal D15 to the DAC 113. Note that the subcarrier multiplexing signal D15 may correspond to one of the XI signal, the XQ signal, the YI signal, and the YQ signal or may correspond to some of the XI signal, the XQ signal, the YI signal, and the YQ signal, like the input digital signal D11.

Figure 7:
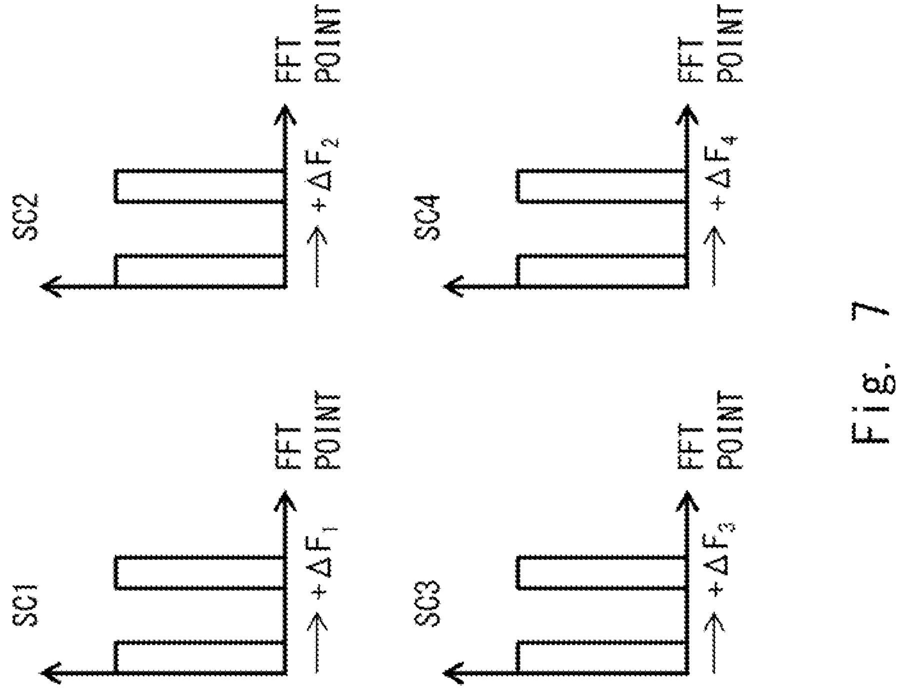
FIG. 7 is a diagram showing an example of signal processing on the transmitter side.
Figure 8:
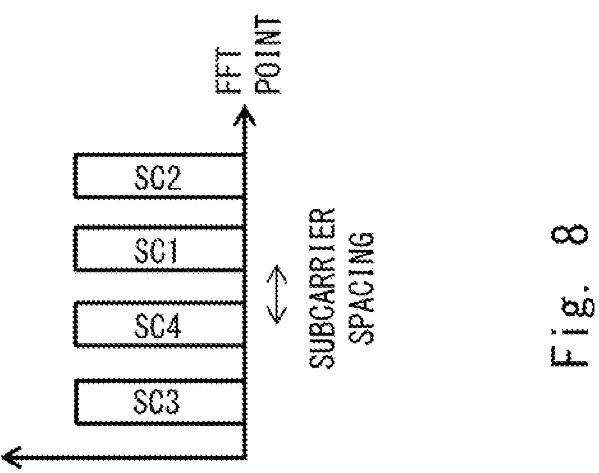
FIG. 8 is a diagram showing an example of the signal processing on the transmitter side.
Figure 9:
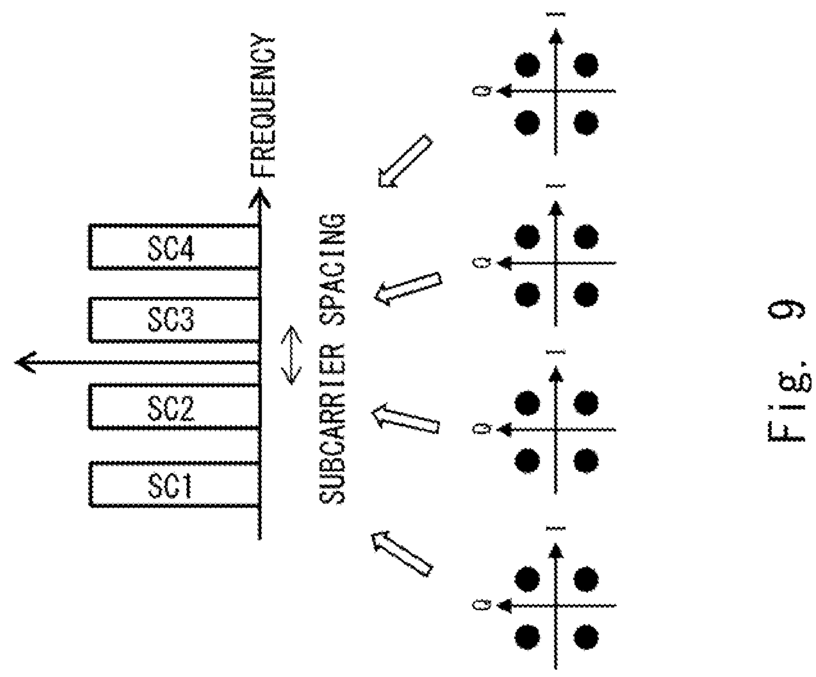
FIG. 9 is a diagram showing an example of the signal processing on the transmitter side.

FIG. 7 shows an example of frequency shifting of the subcarriers SC1 to SC4, FIG. 8 shows an example of spectra in which the subcarriers SC1 to SC4 are arranged in the frequency domain, and FIG. 9 shows spectra of optical modulation signals of the subcarriers SC1 to SC4 after the MZ modulation. While the number of subcarriers is set to be four in this example, the number of subcarriers is not limited to four and may be a desired value. The same is applicable to the following description. As shown in FIG. 7, when the frequency shift amounts of the respective subcarriers SC1 to SC4 are denoted by +ΔF1 to +ΔF4, respectively, the transmitter-side subcarrier arrangement unit 403 shifts the frequencies of the subcarrier FFT signals D13$_{SC1}$ to D13$_{SCm}$ by +ΔF1 to +ΔF4, respectively. As a result, as shown in FIG. 8, the subcarriers SC1 to SC4 (subcarrier arrangement signal D14) arranged in the frequency domain after the frequency shifting become spectra having a predetermined subcarrier spacing. The IFFT unit 404 performs IFFT processing on signals in the frequency domain of the subcarriers SC1 to SC4 in FIG. 8, and then the signals are subjected to MZ modulation by the MZ modulator 123. Then, as shown in FIG. 9, optical modulation signal spectra having a predetermined subcarrier spacing, each including an MZ modulation component, are obtained.

Receiver-Side Digital Signal Processing Unit According to Basic Example

Figure 10:
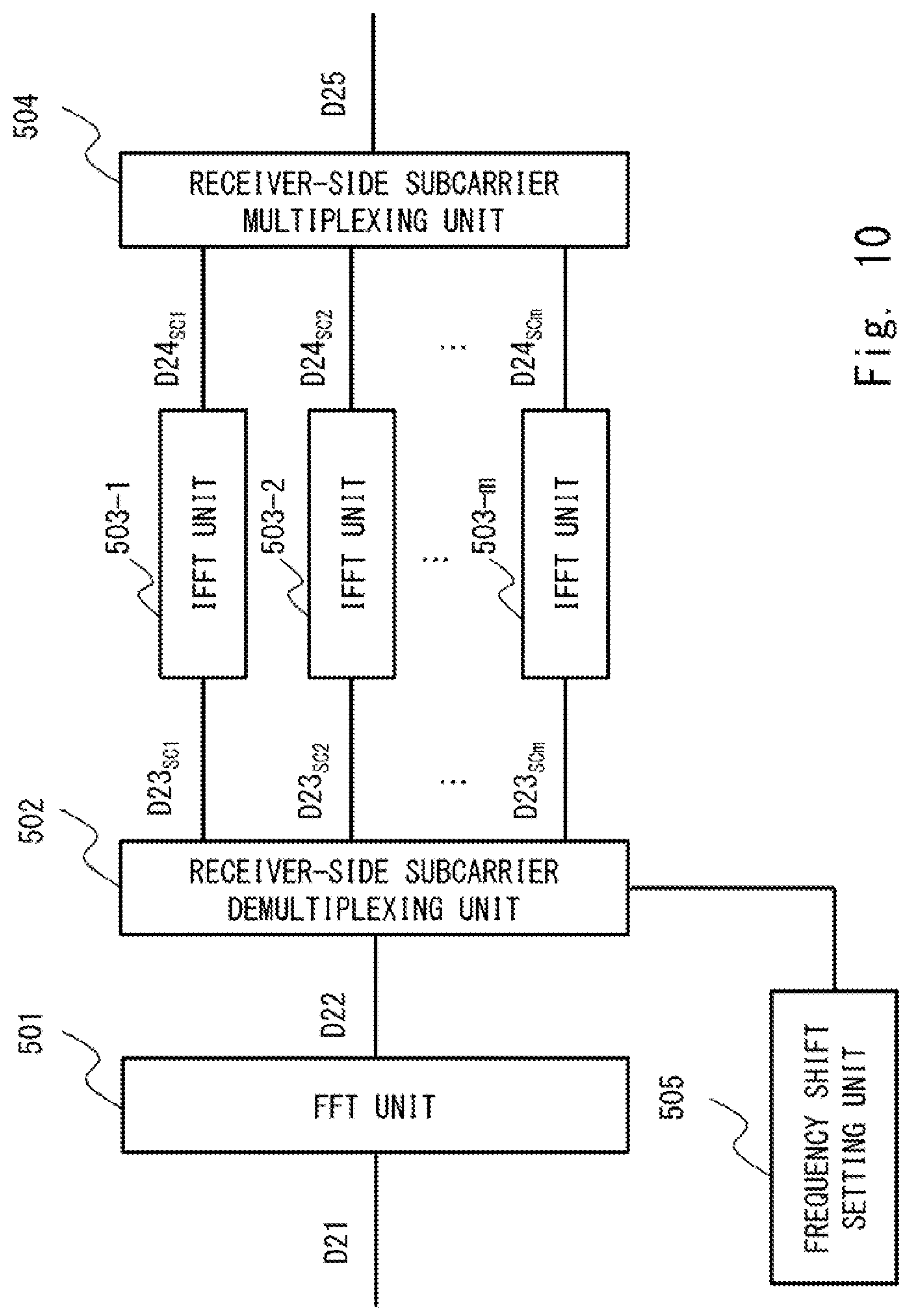
FIG. 10 is a configuration diagram showing a configuration of a receiver-side digital signal processing unit according to the basic example.

FIG. 10 shows a configuration of a receiver-side digital signal processing unit according to a basic example. As shown in FIG. 10, a receiver-side digital signal processing unit 902 according to the basic example includes an FFT unit 501, a receiver-side subcarrier demultiplexing unit 502, IFFT units 503-1 to 503-*m*, a receiver-side subcarrier multiplexing unit 504, and a frequency shift setting unit 505.

The FFT unit 501 performs FFT processing on the input subcarrier multiplexing signal D21 and converts the obtained signal into a subcarrier multiplexing FFT signal D22 in the frequency domain. The input subcarrier multiplexing signal D21, which is a subcarrier-multiplexed digital signal that has been received, is, for example, a signal input via the ADC 211. The subcarrier multiplexing signal D21 may correspond to one of the XI signal, the XQ signal, the YI signal, and the YQ signal that have been AD converted or may correspond to some of the XI signal, the XQ signal, the YI signal, and the YQ signal. The FFT unit 501, which is an overlap-type FFT unit, performs FFT processing by a predetermined FFT block size and an overlap size.

The receiver-side subcarrier demultiplexing unit 502 frequency-shifts a plurality of subcarrier signals in the subcarrier multiplexing FFT signal D22 in the frequency domain by the frequency shift amount of each subcarrier, and generates subcarrier demultiplexing signals D23$_{SC1}$ to D23$_{SCm}$ in the frequency domain demultiplexed for each subcarrier. The receiver-side subcarrier demultiplexing unit 502 is also a frequency shifting unit that frequency-shifts the FFT-processed subcarrier signal by the frequency shift amount. The frequency shift setting unit 505 sets the frequency shift amount of each subcarrier for the receiver-side subcarrier demultiplexing unit 502. The frequency shift amount of each subcarrier is the same as that on the transmitter side. The IFFT units 503-1 to 503-*m* respectively perform IFFT processing on the subcarrier demultiplexing signals D23$_{SC1}$ to D23$_{SCm}$ in the frequency domain, and convert the obtained signals into subcarrier signals D24$_{SC1}$ to D24$_{SCm}$ in the time domain.

The receiver-side subcarrier multiplexing unit 504 multiplexes the subcarrier signals D24$_{SC1}$ to D24$_{SCm}$ for each of the converted subcarriers into a digital signal D25. The receiver-side subcarrier multiplexing unit 504 outputs the multiplexed digital signal D25 to the error correction unit 213. The digital signal D25 may correspond to one of the XI signal, the XQ signal, the YI signal, and the YQ signal or may correspond to some of the XI signal, the XQ signal, the YI signal, and the YQ signal, like the input subcarrier multiplexing signal D21. For example, the receiver-side subcarrier multiplexing unit 504 may convert the subcarrier signals D24$_{SC1}$ to D24$_{SCm}$ into a digital signal D25 by parallel-serial conversion or multiplexes the subcarrier signals D24$_{SC1}$ to D24$_{SCm}$ into the digital signal D25 in accordance with the frame configuration. An error correction unit 213 and a digital signal reproducing unit 214 (decoding unit) may instead be provided in the receiver-side subcarrier multiplexing unit 504 for each subcarrier and decoding may be performed for each subcarrier signal.

<Consideration of Phase Offset>

Figure 11:
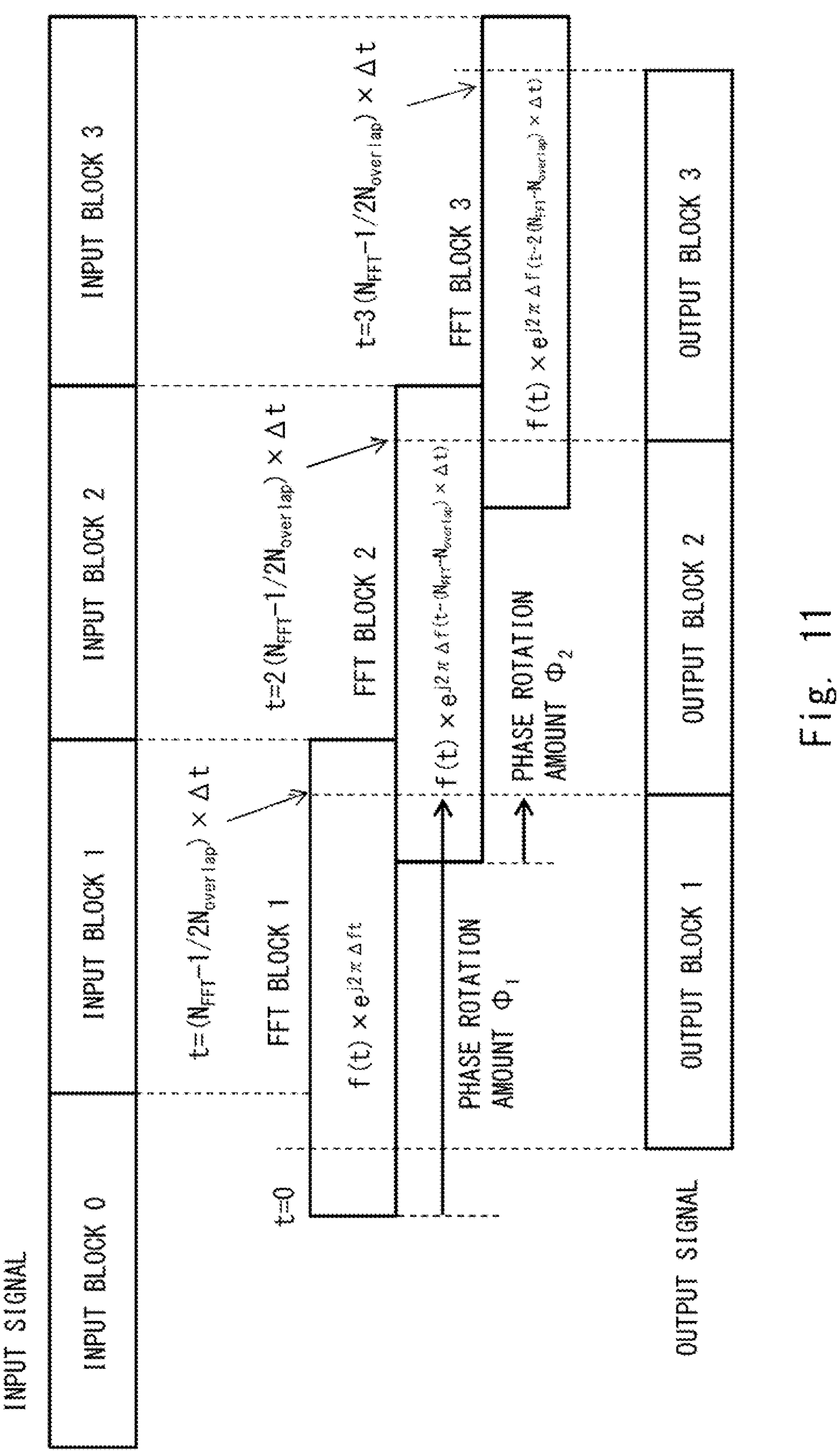
FIG. 11 is a diagram for describing phase offsets occurred by FFT processing.

Next, a phase offset that occurs by frequency shifting which uses overlap FFT processing, which is the problem solved in this example embodiment, will be described. FIG. 11 shows overlap FFT processing executed by the FFT unit 402 of the transmitter-side digital signal processing unit shown in FIG. 6 and the FFT unit 501 of the receiver-side digital signal processing unit shown in FIG. 10.

As shown in FIG. 11, the FFT units 402 and 501 divide an input signal into input blocks having a predetermined length and match each divided input block with data having a predetermined length (overlap size $N_{overlap}$) in the second half of the previous input block. Accordingly, FFT blocks (FFT processing blocks), the lengths of data thereof being equal to the FFT block size (window size) $N_{FFT}$, are generated. The FFT units 402 and 501 perform FFT processing on each of the generated FFT blocks and convert them into signals in a frequency domain. The signals in the frequency domain after the conversion are frequency-shifted, the obtained signals are subjected to IFFT processing, and then the resulting signals are output as output signals (output block).

As described above, when the subcarrier arrangement is performed in the transmitter-side digital signal processing unit and when the subcarrier demultiplexing is performed in the receiver-side digital signal processing unit, frequency shifting processing that uses the overlap-type FFT is performed, whereby the signal of each subcarrier is arranged on the frequency axis. However, as a result of reviewing the basic example, the present inventors have found that phase offsets occur between the FFT blocks as a result of frequency shifting processing. That is, in the frequency shifting processing that uses the overlap-type FFT, phase offsets occur between the FFT blocks in which the input signal is divided into a plurality of signals and FFT blocks before and after the above FFT blocks. For example, in FIG. 11, a phase offset occurs between the FFT block 1 and the FFT block 2 which overlaps the FFT block 1, and a phase offset occurs between the FFT block 2 and the FFT block 3 which overlaps the FFT block 2. Further, a phase offset occurs also when the frequency arrangement of the subcarriers is dynamically changed in accordance with the transmission line. Therefore, with the configuration according to the basic example, there is a problem that an error occurs in a bit string that has been finally recovered in the optical receiver due to the occurrence of the phase offsets.

The conditions in which a phase offset occurs between the FFT blocks that overlap each other is in a case of a specific frequency shift amount and a case in which subcarrier arrangement (frequency shift amount) has been changed. The phase offset amounts that occur in these cases can be obtained as follows.

First, the frequency shift amount Δf is expressed as the next Expression (1) from the FFT block size $N_{FFT}$ and the frequency shift number n (n denotes the number of FFT points). In Expression (1), the f sample is a sampling frequency.

[Expression 1]

$$\Delta f = \frac{f_{sample}}{N_{FFT}} n = \frac{1}{N_{FFT}\Delta t} n \tag{1}$$

The phase rotation amount Φ1 of the FFT block 1 in $t=(N_{FFT}-\frac{1}{2}N_{overlap})\times\Delta t$ in FIG. 11 is as shown by the next Expression (2) and the phase rotation amount Φ2 of the FFT block 2 in the same is as shown by the next Expression (3).

[Expression 2]

$$\phi_1 = 2\pi\Delta f\left(N_{FFT} - \frac{N_{overlap}}{2}\right)\Delta t \tag{2}$$

[Expression 3]

$$\phi_2 = 2\pi\Delta f\frac{N_{overlap}}{2}\Delta t \tag{3}$$

Then, the phase offsets of Φ1 and Φ2 are shown as the next Expression (4) by using Expression (1) from the difference between Expression (2) and Expression (3).

[Expression 4]

$$\begin{aligned}\phi_1 - \phi_2 &= 2\pi\Delta f(N_{FFT} - N_{overlap})\Delta t \\ &= 2\pi\left(1 - \frac{N_{overlap}}{N_{FFT}}\right)n\end{aligned} \tag{4}$$

Further, the phase offset when the subcarrier arrangement is changed can be obtained, like in Expression (2). When Expression (1) is used, the next Expression (5) can be obtained.

[Expression 5]

$$\begin{aligned}\Delta\phi &= 2\pi\Delta f\frac{N_{overlap}}{2}\Delta t \\ &= 2\pi\frac{N_{overlap}}{N_{FFT}}n\end{aligned} \tag{5}$$

As described above, in both the case of the specific frequency shift amount and the case in which subcarrier arrangement has been changed, the phase offset that occurs between the FFT blocks can be obtained from the FFT block size $N_{FFT}$, overlap size $N_{overlap}$, and the frequency shift number n (frequency shift amount) of the subcarrier, as shown in the above Expressions (4) and (5).

In this example embodiment, in the transmitter-side digital signal processing unit and the receiver-side digital signal processing unit, this phase offset is compensated for each of the FFT blocks, whereby subcarrier multiplexing where no bit error occurs is implemented. While an example in which the phase offset is compensated in the transmitter-side digital signal processing unit and the receiver-side digital signal processing unit will be described below, the phase offset may be compensated by one of the transmitter-side digital signal processing unit and the receiver-side digital signal processing unit.

Figure 12:
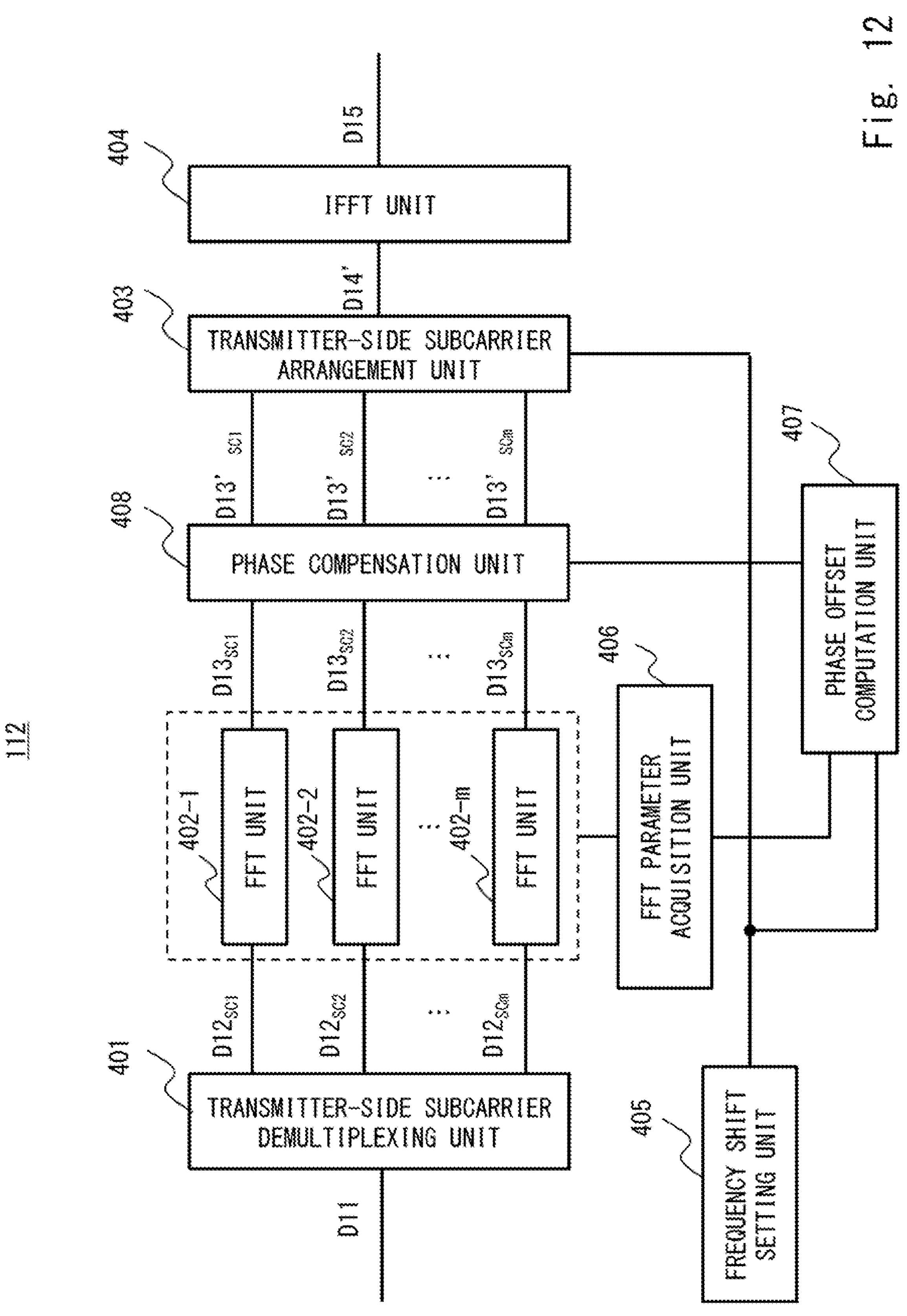
FIG. 12 is a configuration diagram showing a configuration example of a transmitter-side digital signal processing unit according to the first example embodiment.

Transmitter-Side Digital Signal Processing Unit According to First Example Embodiment FIG. 12 shows a configuration example of a transmitter-side digital signal processing unit according to this example embodiment. As shown in FIG. 12, a transmitter-side digital signal processing unit 112 according to this example embodiment includes, besides the components of the basic example shown in FIG. 6, an FFT parameter acquisition unit 406, a phase offset computation unit 407, and a phase compensation unit 408.

The FFT parameter acquisition unit 406 acquires FFT parameters for overlap FFT processing of the FFT units 402-1 to **402-*m*. The FFT parameter acquisition unit 406 acquires an FFT block size $N_{FFT}$ and an overlap size $N_{overlap}$ as FFT parameters. For example, the FFT parameter acquisition unit 406 may acquire parameters stored in a storage unit such as a memory or may acquire the parameters from the FFT units 402-1 to 402-*m*. The FFT block size $N_{FFT}$ and the overlap size $N_{overlap}$ may be the same or different in the FFT units 402-1 to 402-*m*** (all the subcarriers).

The phase offset computation unit 407 computes the phase offset that occurs in each of the subcarrier signals that have been frequency-shifted. The phase offset computation unit 407 computes the phase offset of each subcarrier using the frequency shift number n (frequency shift amount) of each subcarrier set by the frequency shift setting unit 405 and the FFT block size $N_{FFT}$ and the overlap size $N_{overlap}$ of each subcarrier acquired by the FFT parameter acquisition unit 406.

The phase compensation unit 408 compensates the phase offset of each of the subcarrier signals that occur by frequency shifting of the transmitter-side subcarrier arrangement unit 403. In this example, the phase compensation unit 408 compensates the phase offset of each of the subcarrier signals before the frequency shifting and the subcarrier arrangement by the transmitter-side subcarrier arrangement unit 403. Specifically, the phase compensation unit 408 compensates the phase offset of each of the subcarriers computed by the phase offset computation unit 407 on each of the subcarrier signals that have been subjected to FFT processing. Note that the phase offset of the subcarrier signal may be compensated after the frequency shifting and subcarrier arrangement by the transmitter-side subcarrier arrangement unit 403. The phase compensation unit 408 compensates the phase offset that occurs in the case of the specific frequency shift amount and the case in which subcarrier arrangement has been changed. For example, the transmitter-side subcarrier arrangement unit 403, the phase offset computation unit 407, and the phase compensation unit 408 form a generation unit that generates a signal that has been frequency-shifted and in which the phase offset is compensated.

Figure 13:
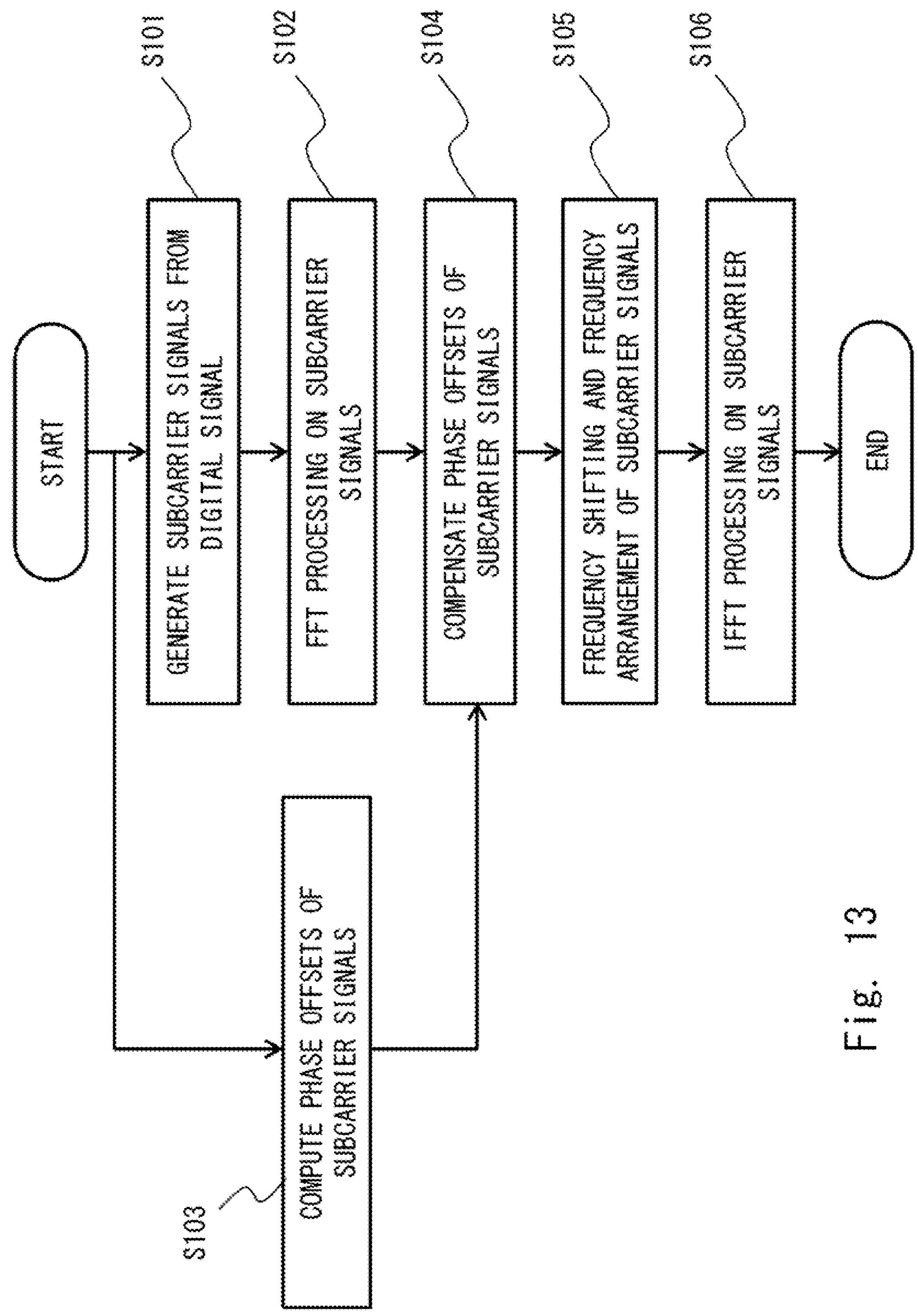
FIG. 13 is a flowchart showing of an operation example of the transmitter-side digital signal processing unit according to the first example embodiment.

FIG. 13 shows an operation example of a transmitter-side digital signal processing unit according to this example embodiment. As shown in FIG. 13, first, the transmitter-side digital signal processing unit 112 generates subcarrier signals from the digital signal (S101). The transmitter-side subcarrier demultiplexing unit 401 demultiplexes the digital signal D11 input from the encoding unit 111 into subcarrier signals D12$_{SC1}$ to D12$_{SCm}$ by the serial-parallel conversion or the demultiplexing in accordance with the frame configuration.

Next, the transmitter-side digital signal processing unit 112 performs FFT processing on the subcarrier signals (S102). The FFT units 402-1 to **402-*m* perform overlap FFT processing on the subcarrier signals D12$_{SC1}$ to D12$_{SCm}$ generated by the transmitter-side subcarrier demultiplexing unit 401 by the preset FFT block size $N_{FFT}$ and the overlap size $N_{overlap}$, thereby converting them into subcarrier FFT signals D13$_{SC1}$ to D13**$_{SCm}$ in the frequency domain.

On the other hand, the transmitter-side digital signal processing unit 112 computes the phase offsets of the subcarrier signals (S103). The phase offset computation unit 407 computes the phase offset of each subcarrier using the FFT block size $N_{FFT}$, the overlap size $N_{overlap}$, and the frequency shift number n. Specifically, in the case of the specific frequency shift amount, the phase offset computation unit 407 computes the phase offset by inputting the FFT block size $N_{FFT}$, the overlap size $N_{overlap}$, and the frequency shift number n into the above Expression (4). When the subcarrier arrangement has been changed, the phase offset computation unit 407 computes the phase offset by inputting the FFT block size $N_{FFT}$, the overlap size $N_{overlap}$, and the frequency shift number n into the above Expression (5). For example, first, at a timing when the frequency shift amount has been set, the phase offset is computed by the above Expression (4), and after that, at the timing when the subcarrier arrangement (frequency shift amount) has been changed, the phase offset is computed by the above Expression (5).

Next, the transmitter-side digital signal processing unit 112 compensates the phase offsets of the subcarrier signals (S104). The phase compensation unit 408 compensates the phase offsets that occur in the subcarrier FFT signals D13$_{SC1}$ to D13$_{SCm}$ in the frequency domain converted by the FFT units 402-1 to **402-*m* for each of the FFT blocks based on the phase offset of each of the subcarriers computed by the phase offset computation unit 407, and generates the subcarrier FFT signals D13'$_{SC1}$ to D13'$_{SCm}$ after the compensation (compensated). The phase compensation unit 408 derotates the phase of each of the subcarrier signals that have been subjected to the FFT processing by the amount of the phase offset computed by the phase offset computation unit 407 in the above Expression (4) or (5). It can be said that the phase compensation unit 408** compensates the phase offset that occurs in accordance with a relation between the FFT block size $N_{FFT}$ and the overlap size $N_{overlap}$ of the FFT processing, and the frequency shift number n (frequency shift amount). Specifically, in the case of the specific frequency shift amount, phase compensation is performed on each subcarrier signal by the phase compensation amount in the next Expression (6). When the subcarrier arrangement has been changed, phase compensation is performed on each subcarrier signal by the phase compensation amount in the next Expression (7).

[Expression 6]

$$*\exp\left(-1i*2\pi\left(1-\frac{N_{overlap}}{N_{FFT}}\right)n\right) \tag{6}$$

[Expression 7]

$$*\exp\left(-1i*2\pi\frac{N_{overlap}}{N_{FFT}}n\right) \tag{7}$$

Next, the transmitter-side digital signal processing unit 112 performs frequency shifting and frequency arrangement of the subcarrier signals (S105). The transmitter-side subcarrier arrangement unit 403 frequency-shifts the subcarrier FFT signals D13'$_{SC1}$ to D13'$_{SCm}$ in the frequency domain in which the phase offset has been compensated by the phase compensation unit 408 by the frequency shift amount (frequency shift number n) of each subcarrier set from the frequency shift setting unit 405 and generates a subcarrier arrangement signal D14' arranged in the frequency domain. This subcarrier arrangement signal D14' becomes a subcarrier arrangement signal after the phase offset compensation (compensated).

Next, the transmitter-side digital signal processing unit 112 performs IFFT processing on the subcarrier signals (S106). The IFFT unit 404 performs IFFT processing on the subcarrier arrangement signal D14' after phase offset compensation arranged by the transmitter-side subcarrier arrangement unit 403, converts the obtained signal into a subcarrier multiplexing signal D15 in the time domain, and outputs the converted subcarrier multiplexing signal D15 to the DAC 113.

Figure 14:
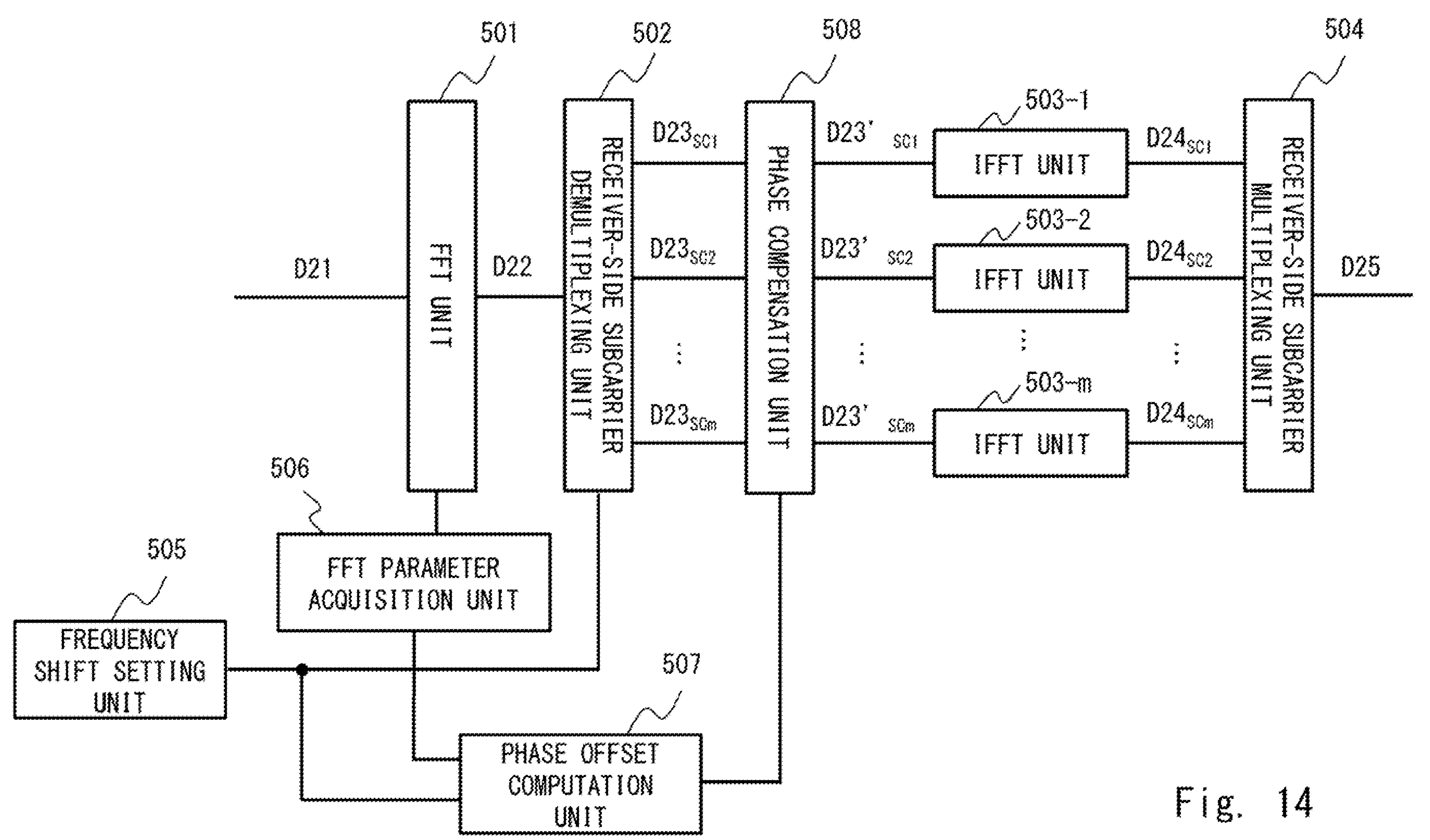
FIG. 14 is a configuration diagram showing a configuration example of a receiver-side digital signal processing unit according to the first example embodiment.

Receiver-Side Digital Signal Processing Unit According to First Example Embodiment FIG. 14 shows a configuration example of the receiver-side digital signal processing unit according to this example embodiment. As show in FIG. 14, the receiver-side digital signal processing unit 212 according to this example embodiment includes, besides the components of the basic example shown in FIG. 10, an FFT parameter acquisition unit 506, a phase offset computation unit 507, and a phase compensation unit 508.

The FFT parameter acquisition unit 506 acquires an FFT block size $N_{FFT}$ and an overlap size $N_{overlap}$, which are FFT parameters of the FFT unit 501, like the transmitter-side FFT parameter acquisition unit 406. For example, the FFT block size $N_{FFT}$ and the overlap size $N_{overlap}$ are the same in all the subcarriers.

Like the transmitter-side phase offset computation unit 407, the phase offset computation unit 507 computes the phase offset of each subcarrier using the frequency shift number n set by the frequency shift setting unit 505 and the FFT block size $N_{FFT}$ and the overlap size $N_{overlap}$ acquired by the FFT parameter acquisition unit 506.

Like the transmitter-side phase compensation unit 408, the phase compensation unit 508 compensates the phase offset of each subcarrier that occurs by frequency shifting of the receiver-side subcarrier demultiplexing unit 502 based on the phase offset of each of the subcarriers computed by the phase offset computation unit 507. For example, the receiver-side subcarrier demultiplexing unit 502, the phase offset computation unit 507, and the phase compensation unit 508 form a generation unit that generates a signal that has been frequency-shifted and in which the phase offset is compensated.

Figure 15:
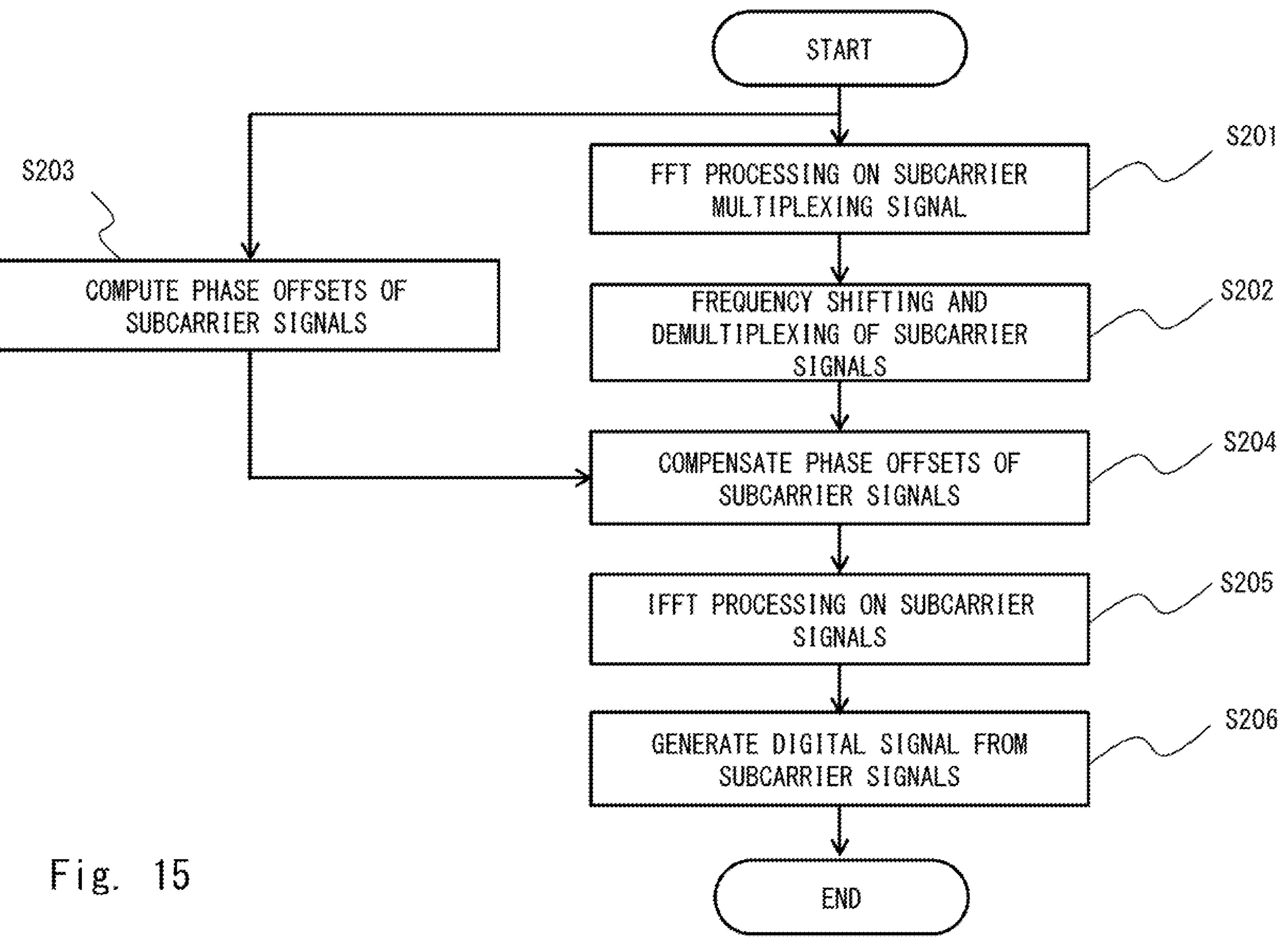
FIG. 15 is a flowchart showing an operation example of a receiver-side digital signal processing unit according to the first example embodiment.

FIG. 15 shows an operation example of the receiver-side digital signal processing unit according to this example embodiment. As shown in FIG. 15, first, the receiver-side digital signal processing unit 212 performs FFT processing on the subcarrier multiplexing signal (S201). The FFT unit 501 performs overlap FFT processing on the subcarrier multiplexing signal D21 input via the ADC 211 by the preset FFT block size $N_{FFT}$ and overlap size $N_{overlap}$, and converts the obtained signal into a subcarrier multiplexing FFT signal D22 in the frequency domain.

Next, the receiver-side digital signal processing unit 212 performs frequency shifting and demultiplexing of subcarrier signals (S202). The receiver-side subcarrier demultiplexing unit 502 performs frequency shifting of a plurality of subcarrier signals in the subcarrier multiplexing FFT signal D22 in the frequency domain converted by the FFT unit 501 by a frequency shift amount of each subcarrier set from the frequency shift setting unit 505 and generates subcarrier demultiplexing signals $\mathbf{D23}_{SC1}$ to $\mathbf{D23}_{SCm}$ demultiplexed for each subcarrier in the frequency domain.

On the other hand, the receiver-side digital signal processing unit 212 computes the phase offsets of the subcarrier signals (S203). Like in the transmitter-side phase offset computation unit 407, in the case of the specific frequency shift amount, the phase offset computation unit 507 computes the phase offsets by the above Expression (4). When the subcarrier arrangement has been changed, the phase offset computation unit 507 computes the phase offsets by the above Expression (5).

Next, the receiver-side digital signal processing unit 212 compensates the phase offsets of the subcarrier signals (S204). Like the transmitter-side phase compensation unit 408, in the case of the specific frequency shift amount, the phase compensation unit 508 performs phase compensation on each of the subcarrier signals that have been frequency-shifted by the phase compensation amount in the above Expression (6) for each of the FFT blocks. When the subcarrier arrangement has been changed, the phase compensation unit 508 performs phase compensation on each of the subcarrier signals that have been frequency-shifted by the phase compensation amount in the above Expression (7) for each of the FFT blocks, thereby generating subcarrier demultiplexing signals $\mathbf{D23'}_{SC1}$ to $\mathbf{D23'}_{SCm}$ after the compensation.

Next, the receiver-side digital signal processing unit 212 performs IFFT processing on the subcarrier signals (S205). The IFFT unit 503 performs IFFT processing on the subcarrier demultiplexing signals $\mathbf{D23'}_{SC1}$ to $\mathbf{D23'}_{SCm}$ in which phase offsets have been compensated by the phase compensation unit 508, and converts the obtained signals into subcarrier signals $\mathbf{D24}_{SC1}$ to $\mathbf{D24}_{SCm}$ in the time domain.

Next, the receiver-side digital signal processing unit 212 generates a digital signal from the subcarrier signals (S206). The receiver-side subcarrier multiplexing unit 504 multiplexes the subcarrier signals $\mathbf{D24}_{SC1}$ to $\mathbf{D24}_{SCm}$ into the digital signal D25 by the parallel-serial conversion or the multiplexing in accordance with the frame configuration and outputs the multiplexed digital signal D25 to the error correction unit 213.

As described above, in this example embodiment, in a digital coherent optical transmitter and an optical receiver in which the optical phase modulation system and the polarization multiplexing/demultiplexing technique are combined with each other, a phase offset that occurs by frequency shifting using the overlap-type FFT at the time of subcarrier multiplexing and demultiplexing is computed, and the phase offset is compensated for each of the FFT blocks. Accordingly, the occurrence of the phase offset can be appropriately prevented, whereby it is possible to implement subcarrier multiplexing where a bit error does not occur in the optical receiver.

Second Example Embodiment

Hereinafter, with reference to the drawings, a second example embodiment will be described. In this example embodiment, an example of setting the overlap size $N_{overlap}$ and the FFT block size $N_{FFT}$ to a specific relation in the configuration of the first example embodiment will be described.

Figure 16:
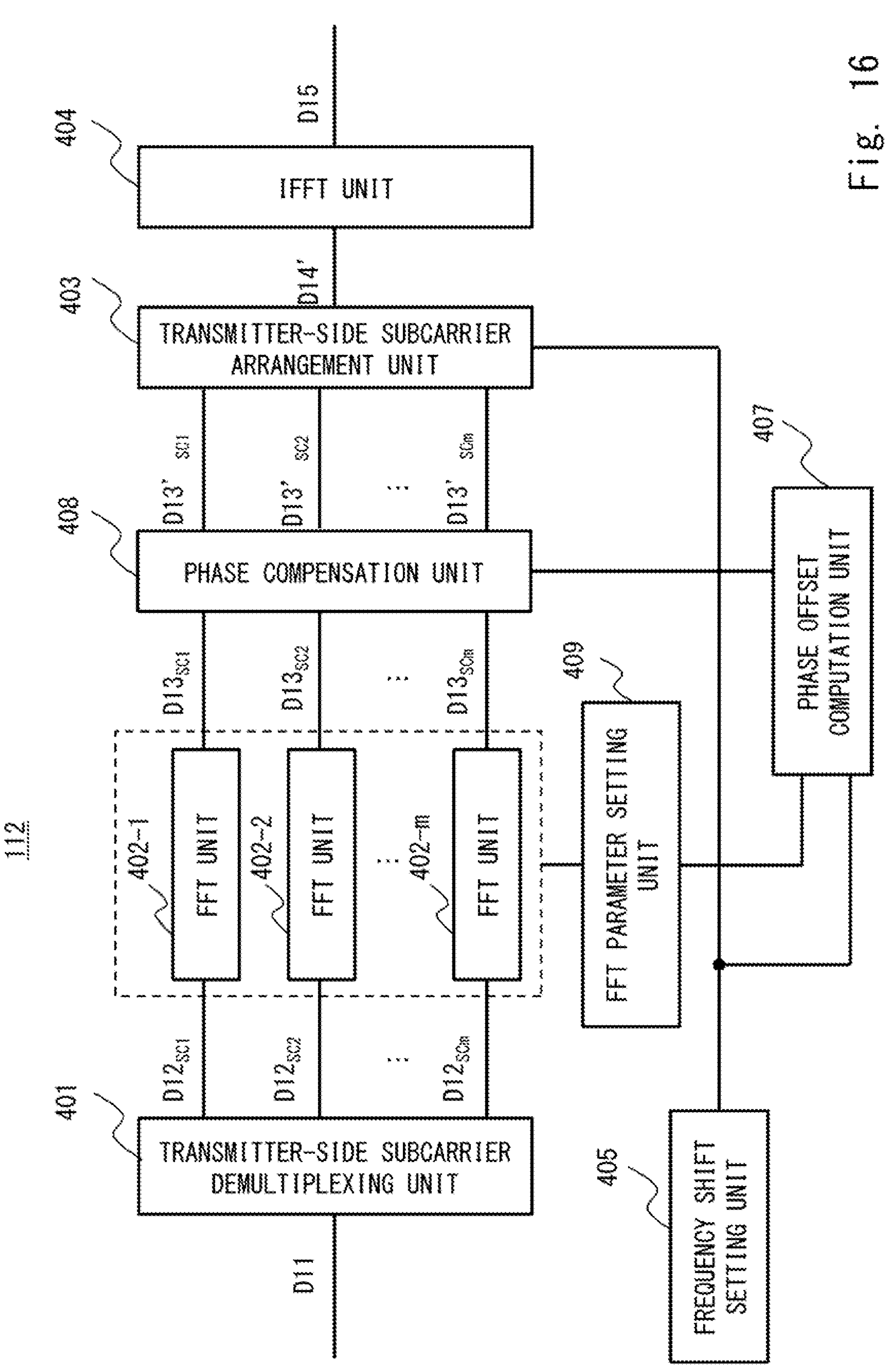
FIG. 16 is a configuration diagram showing a configuration example of a transmitter-side digital signal processing unit according to a second example embodiment.

FIG. 16 shows a configuration example of a transmitter-side digital signal processing unit according to this example embodiment. As shown in FIG. 16, a transmitter-side digital signal processing unit 112 according to this example embodiment is different from that according to the first example embodiment in that the transmitter-side digital signal processing unit 112 according to this example embodiment includes an FFT parameter setting unit 409 in place of the FFT parameter acquisition unit 406.

The FFT parameter setting unit 409 sets FFT parameters for the overlap FFT processing for the FFT units 402-1 to 402-*m*. The FFT parameter setting unit 409 sets an FFT block size $N_{FFT}$ and an overlap size $N_{overlap}$ as the FFT parameters.

The FFT parameter setting unit 409 sets the FFT block size $N_{FFT}$ and the overlap size $N_{overlap}$ in such a way that there is a predetermined relation between them, specifically, in such a way that overlap size $N_{overlap}$=FFT block size $N_{FFT}\times\frac{1}{2}$ is established. Then, the phase compensation amount in the phase compensation unit 408 is as shown by the next Expression (8) in the case of the specific frequency shift amount and is as shown by the next Expression (9) when the subcarrier arrangement has been changed. Therefore, the phase offset may be compensated by multiplying the real part or the imaginary part by a sign, whereby the phase compensation unit 408 can be implemented by a simple circuit.

[Expression 8]

$$*\exp\left(-1i*2\pi\frac{1}{2}n\right),\ n=\text{odd}:*(-1),\ n=\text{even}:*(1) \tag{8}$$

[Expression 9]

$$*\exp\left(-1i*2\pi\frac{1}{4}n\right), \tag{9}$$

$$n=1,2,3,4,5,\ldots:*(-1i),\ *(-1),\ *(-1i),\ *(-1),\ *(-1i),\ \ldots$$

Figure 17:
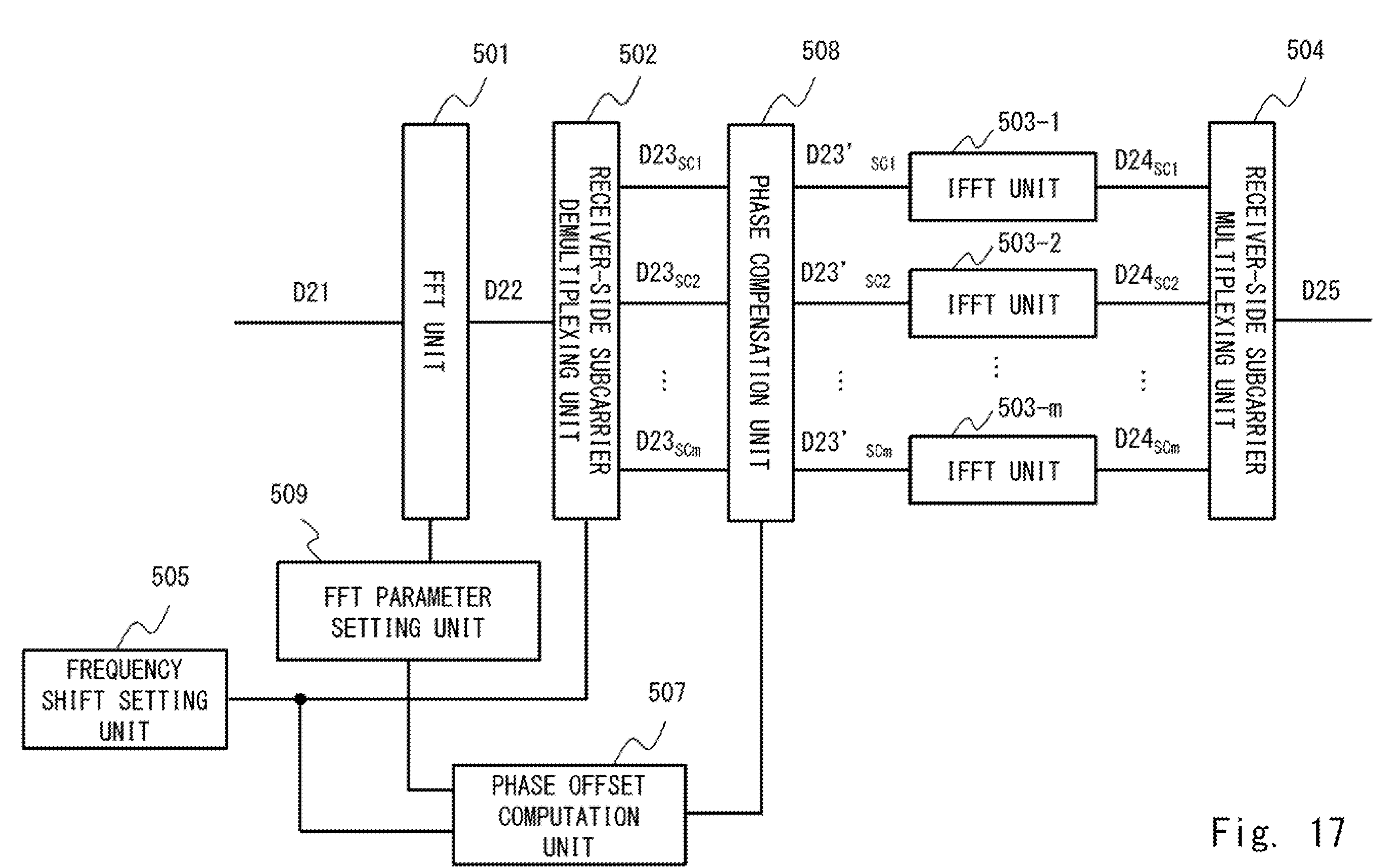
FIG. 17 is a configuration diagram showing a configuration example of a receiver-side digital signal processing unit according to the second example embodiment.

FIG. 17 shows a configuration example of the receiver-side digital signal processing unit according to this example embodiment. As shown in FIG. 17, a receiver-side digital signal processing unit 212 according to this example embodiment is different from that according to the first example embodiment in that the receiver-side digital signal processing unit 212 includes an FFT parameter setting unit 509 in place of the FFT parameter acquisition unit 506.

The FFT parameter setting unit 509 sets the overlap size $N_{overlap}$ and the FFT block size for the FFT unit 501 in such a way that overlap size $N_{overlap}$=FFT block size $N_{FFT}\times 1/2$ is established, like in the processing performed on the transmitter side. The phase compensation amount of the phase compensation unit 508 is as shown by the above Expression (8) in the case of the specific frequency shift amount and is as shown by the above Expression (9) when the subcarrier arrangement has been changed, like in the processing performed on the transmitter side.

As described above, according to this example embodiment, in the configuration according to the first example embodiment, the overlap size $N_{overlap}$ and the FFT block size $N_{FFT}$ are made to have a specific relation, whereby the phase compensation unit can be formed with a simple circuit configuration.

Third Example Embodiment

Hereinafter, with reference to the drawings, a third example embodiment will be described. In this example embodiment, a specific example of dynamically changing the subcarrier arrangement in the configurations of the first and second example embodiments will be described.

FIG. 18 shows a configuration example of an optical transmission system 1 according to this example embodiment. As shown in FIG. 18, the optical transmission system 1 according to this example embodiment includes an optical transmitter 100 and an optical receiver 200 that are similar to those in the first example embodiment.

In this example embodiment, transmission line characteristics and the number of error corrections for optimizing subcarrier arrangement are reported from the optical receiver 200 to the optical transmitter 100. Only one of the transmission line characteristics and the number of error corrections may be reported or other transmission quality information or the like may be reported. While the means for reporting the notification from the optical receiver 200 to the optical transmitter 100 is not particularly limited, the notification is sent, for example, via a desired transmission line other than the optical fiber transmission line 300.

The receiver-side digital signal processing unit 212 includes a detection unit (not shown) that detects transmission line characteristics based on the reception signal and notifies the transmitter-side digital signal processing unit 112 of the detected transmission line characteristics. For example, transmission line characteristics such as band narrowing due to adjacent channels in Wavelength Division Multiplexing (WDM) transmission or Reconfigurable Optical Add/Drop Multiplexer (ROADM) are detected and reported. Further, the error correction unit 213 notifies the transmitter-side digital signal processing unit 112 of the number of error corrections, which a verification result of error correction processing on the reception signal. The error correction unit 213 may report the error correction result such as an error correction rate or other decoding result information, not the number of error corrections.

Figure 19:
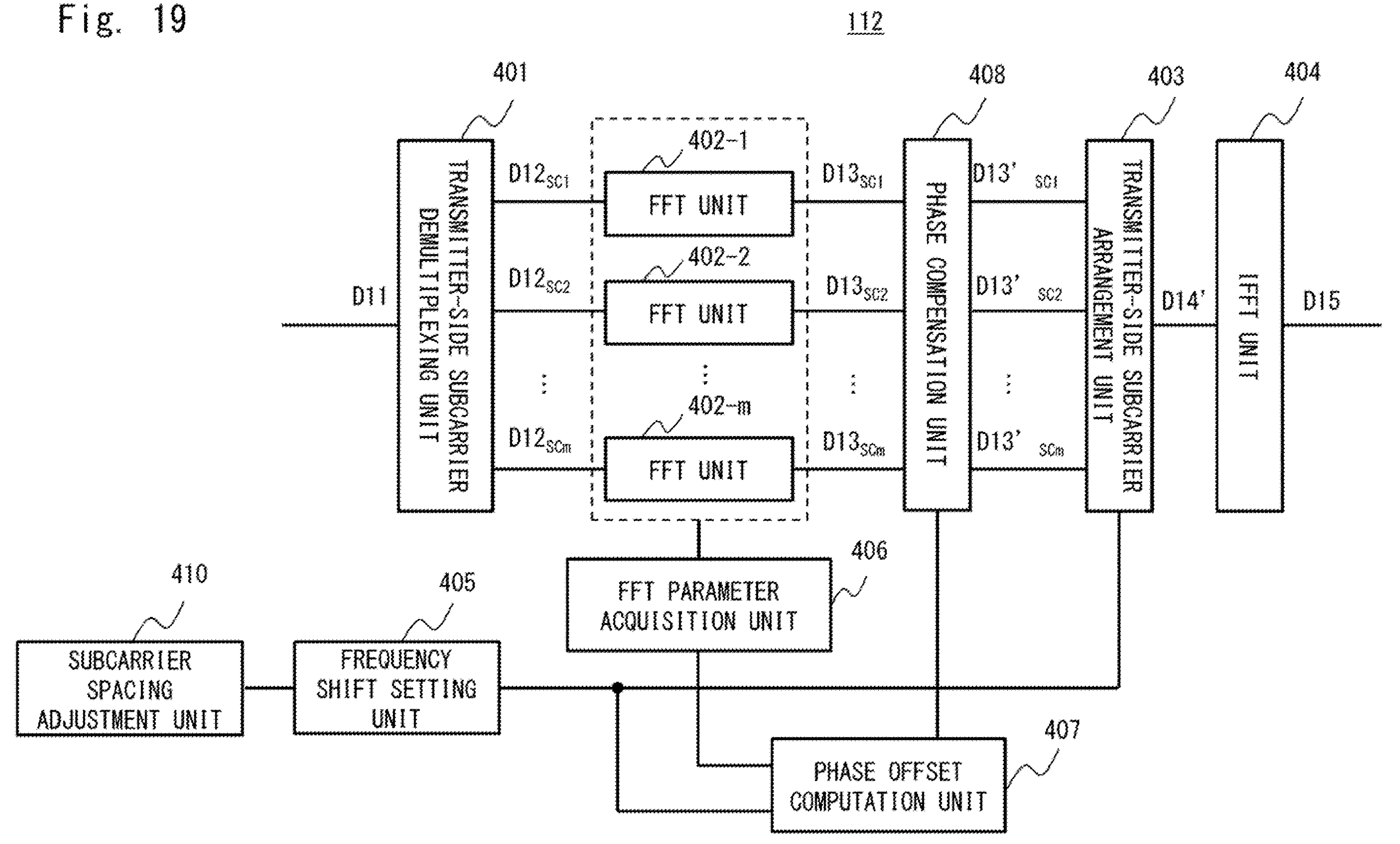
FIG. 19 is a configuration diagram showing a configuration example of a transmitter-side digital signal processing unit according to the third example embodiment.

FIG. 19 shows a configuration example of the transmitter-side digital signal processing unit according to this example embodiment. As shown in FIG. 19, the transmitter-side digital signal processing unit 112 according to this example embodiment includes, besides the components in the first example embodiment, a subcarrier spacing adjustment unit 410.

The subcarrier spacing adjustment unit 410 adjusts the subcarrier spacing of each subcarrier based on the transmission line characteristics and the number of error corrections reported from the optical receiver 200. In this example embodiment, the frequency shift setting unit 405 computes the frequency shift number n of each subcarrier based on the subcarrier spacing adjusted by the subcarrier spacing adjustment unit 410 and sets the computed frequency shift number n in the transmitter-side subcarrier arrangement unit 403. The frequency shift setting unit 405 is also a computation unit that computes the frequency shift number n (frequency shift amount) of each subcarrier based on the transmission line characteristics or the number of error corrections. Further, the phase offset computation unit 407 computes the phase offset of each subcarrier based on the frequency shift number that has been computed and set.

Figure 20:
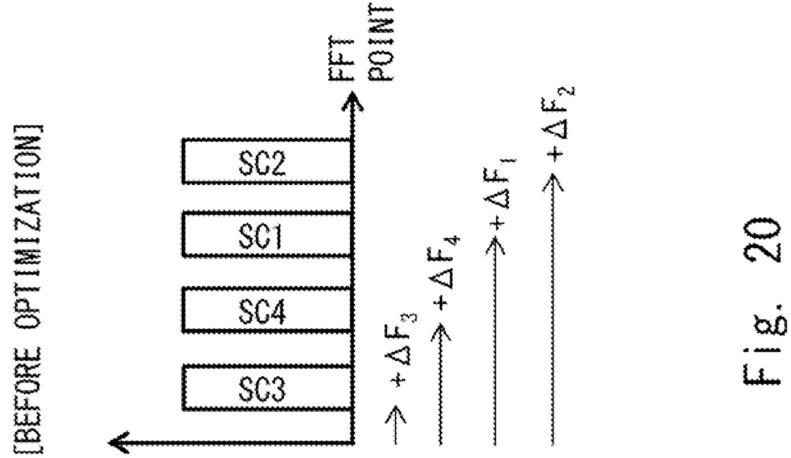
FIG. 20 is a diagram showing an example of signal processing according to the third example embodiment.
Figure 21:
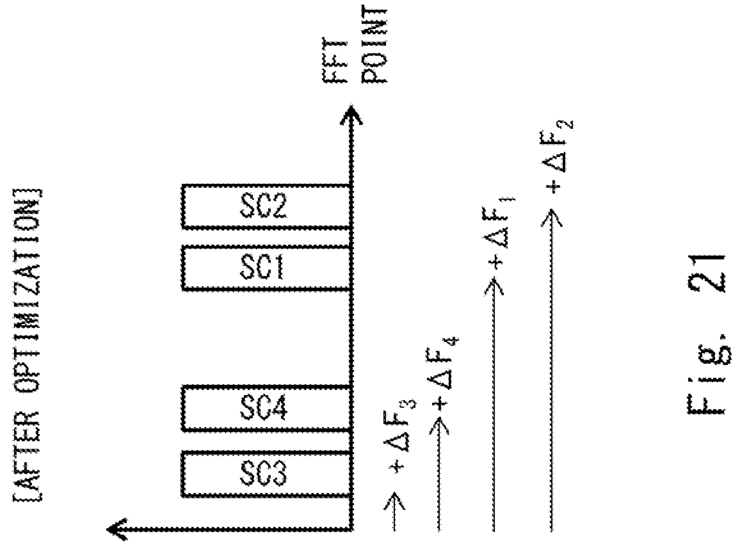
FIG. 21 is a diagram showing an example of the signal processing according to the third example embodiment.

FIG. 20 shows signal spectra after FFT processing before optimization by the transmission line characteristics and the number of error corrections and FIG. 21 shows signal spectra after FFT processing after optimization by the transmission line characteristics and the number of error corrections. It is assumed, for example, that subcarrier spacing (frequency shifting) of the subcarriers SC1 to SC4 are respectively +ΔF1 to +ΔF4 and the subcarriers are arranged as shown in FIG. 20 before the optimization. In this case, when it is estimated from the transmission line characteristics and the number of error corrections that the transmission qualities of the subcarrier SC1 and the subcarrier SC4 are poor, the subcarrier spacing adjustment unit 410 adjusts the subcarrier spacing +ΔF1 to +ΔF4 as shown in FIG. 21 and widens the interval between the subcarrier SC1 and the subcarrier SC4. Accordingly, it is possible to improve the transmission qualities of the subcarrier SC1 and the subcarrier SC4.

As described above, according to this example embodiment, by dynamically adjusting the subcarrier spacing from the characteristics of the transmission line detected by the receiver-side digital signal processing unit or the number of error corrections verified by the error correction unit and changing the frequency shift number and the phase compensation amount, the frequency usage efficiency can be optimized.

Fourth Example Embodiment

Hereinafter, with reference to the drawings, a fourth example embodiment will be described. In this example embodiment, an example of setting the frequency shift amount in such a way that a phase offset does not occur in the configurations of the first to third example embodiments will be described.

Figure 22:
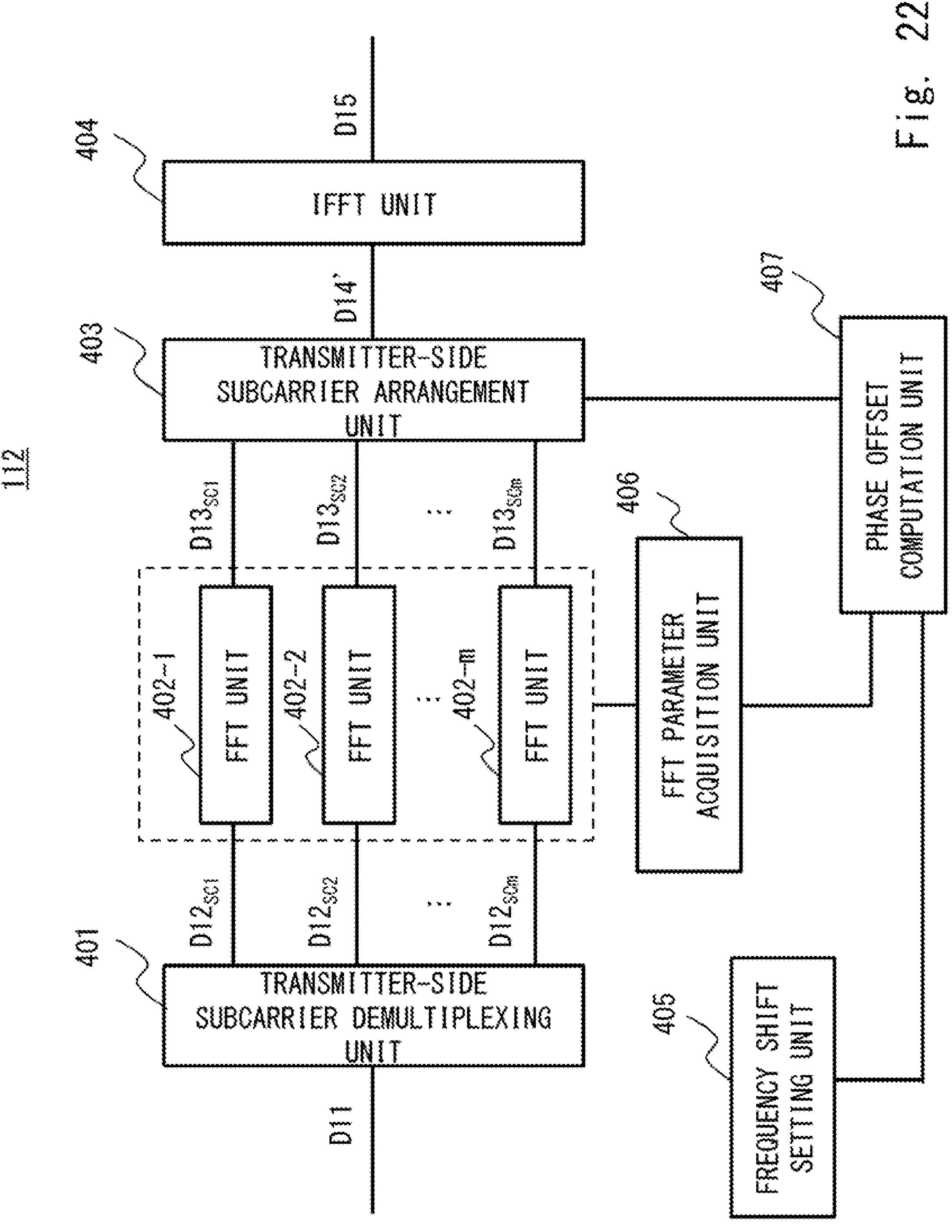
FIG. 22 is a configuration diagram showing a configuration example of a transmitter-side digital signal processing unit according to a fourth example embodiment.

FIG. 22 shows a configuration example of a transmitter-side digital signal processing unit according to this example embodiment. As shown in FIG. 22, a transmitter-side digital signal processing unit 112 according to this example embodiment is different from that according to the first example embodiment in that the transmitter-side digital signal processing unit 112 according to this example embodiment does not include the phase compensation unit 408. That is, the transmitter-side digital signal processing unit 112 includes a transmitter-side subcarrier demultiplexing unit 401, FFT units 402-1 to **402-*m*, a transmitter-side subcarrier arrangement unit 403, an IFFT unit 404, a frequency shift setting unit 405, an FFT parameter acquisition unit 406, and a phase offset computation unit 407**.

In this example embodiment, the phase offset computation unit 407 computes the phase offset of each subcarrier and sets a frequency offset where a phase offset does not occur in the transmitter-side subcarrier arrangement unit 403 based on the FFT block size $N_{FFT}$ and the overlap size $N_{overlap}$. The phase offset computation unit 407 is also a frequency shift amount computation unit that computes the frequency shift amount in such a way that the phase offset of the frequency-shifted signal becomes a predetermined amount. Specifically, the phase offset computation unit 407 computes the frequency shift amount in such a way that a predetermined amount becomes equal to an integral multiple of 2π. The transmitter-side subcarrier arrangement unit 403 performs frequency shifting by the frequency shift amount computed by the phase offset computation unit 407, thereby generating a subcarrier arrangement signal D14' in which the phase offset has been compensated. For example, the transmitter-side subcarrier arrangement unit 403 and the phase offset computation unit 407 form a generation unit that generates a signal that has been frequency-shifted and in which the phase offset is compensated.

Like in the first example embodiment, the phase offset of each subcarrier is obtained from the above Expression (4) in the case of the specific frequency shift amount, and is obtained from the above Expression (5) when the subcarrier arrangement has been changed. By setting the frequency shifting in such a way that this phase offset becomes equal to an integral multiple of 2π, the occurrence of the phase offset can be reduced.

If it is assumed, for example, that overlap size $N_{overlap}$=FFT block size $N_{FFT}$×½ is established, in the case of the specific frequency shift amount, if limited to the integral multiple of n=2, the phase offset is as shown in the next Expression (10). When the subcarrier arrangement has been changed, if limited to the integral multiple of n=4, the phase offset is as shown in the next Expression (11) (k is any integer). Therefore, when overlap size $N_{overlap}$=FFT block size $N_{FFT}$×½ is established in the case of the specific frequency shift amount, the phase offset computation unit 407 sets the frequency shift number of each subcarrier in such a way that it becomes equal to an integral multiple of n=2. When the subcarrier arrangement has been changed, the phase offset computation unit 407 sets the frequency shift number of each subcarrier in such a way that it becomes equal to an integral multiple of n=4.

[Expression 10]

$$\phi_1 - \phi_2 = 2\pi\frac{1}{2}n = 2\pi * k \tag{10}$$

[Expression 11]

$$\Delta\phi = 2\pi\frac{1}{4}n = 2\pi * k \tag{11}$$

Further, when overlap size $N_{overlap}$=FFT block size $N_{FFT}$×¼ is established, in the case of the specific frequency shift amount, if limited to the integral multiple of n=4, the phase offset is as shown in the next Expression (12). When the subcarrier arrangement has been changed, if limited to the integral multiple of n=8, the phase offset is as shown in the next Expression (13). Therefore, when the overlap size $N_{overlap}$=FFT block size $N_{FFT}$×¼ is established, in the case of the specific frequency shift amount, the phase offset computation unit 407 sets the frequency shift number of each subcarrier in such a way that it becomes equal to an integral multiple of n=4. When the subcarrier arrangement has been changed, the phase offset computation unit 407 sets the frequency shift number of each subcarrier in such a way that it becomes equal to an integral multiple of n=8.

[Expression 12]

$$\phi_1 - \phi_2 = 2\pi\frac{1}{4}n = 2\pi * k \tag{12}$$

[Expression 13]

$$\Delta\phi = 2\pi\frac{1}{8}n = 2\pi * k \tag{13}$$

Figure 23:
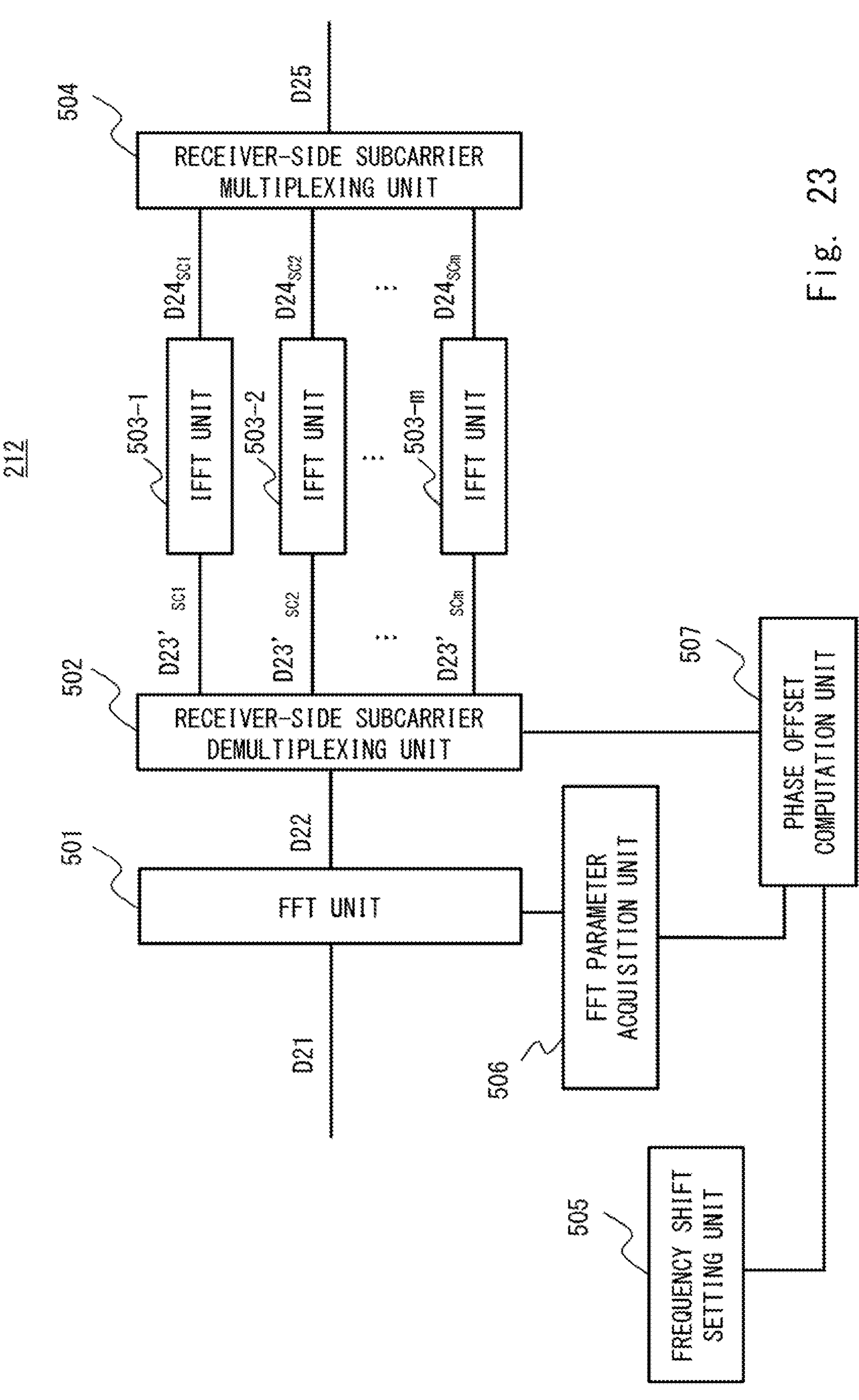
FIG. 23 is a configuration diagram showing a configuration example of a receiver-side digital signal processing unit according to the fourth example embodiment.

FIG. 23 shows a configuration example of the receiver-side digital signal processing unit according to this example embodiment. As shown in FIG. 22, the receiver-side digital signal processing unit 212 according to this example embodiment is different from that according to the first example embodiment in that the receiver-side digital signal processing unit 212 according to this example embodiment does not include a phase compensation unit 508. That is, the receiver-side digital signal processing unit 212 includes an FFT unit 501, a receiver-side subcarrier demultiplexing unit 502, IFFT units 503-1 to **503-*m*, a receiver-side subcarrier multiplexing unit 504, a frequency shift setting unit 505, an FFT parameter acquisition unit 506, and a phase offset computation unit 507**.

In this example embodiment, the phase offset computation unit 507 computes the phase offset of each subcarrier and sets a frequency offset where a phase offset does not occur in the receiver-side subcarrier demultiplexing unit 502, like in the processing performed on the transmitter side. The receiver-side subcarrier demultiplexing unit 502 performs frequency shifting by the frequency shift amount computed by the phase offset computation unit 507, thereby generating subcarrier demultiplexing signals D23'$_{SC1}$ to D23'$_{SCm}$ in which the phase offset has been compensated. For example, the receiver-side subcarrier demultiplexing unit 502 and the phase offset computation unit 507 form a generation unit configured to generate a signal that has been frequency-shifted and in which the phase offset is compensated.

As described above, according to this example embodiment, by setting the frequency shift amount that does not occur a phase offset based on the FFT block size $N_{FFT}$ and the overlap size $N_{overlap}$, the subcarrier arrangement signals and the subcarrier demultiplexing signals in which the phase offset is compensated may be generated. Therefore, it is possible to obtain effects similar to those obtained in the first example embodiment without providing the phase compensation unit.

The present disclosure is not limited to the aforementioned example embodiments and may be changed as appropriate without departing from the spirit of the present disclosure.

Figure 24:
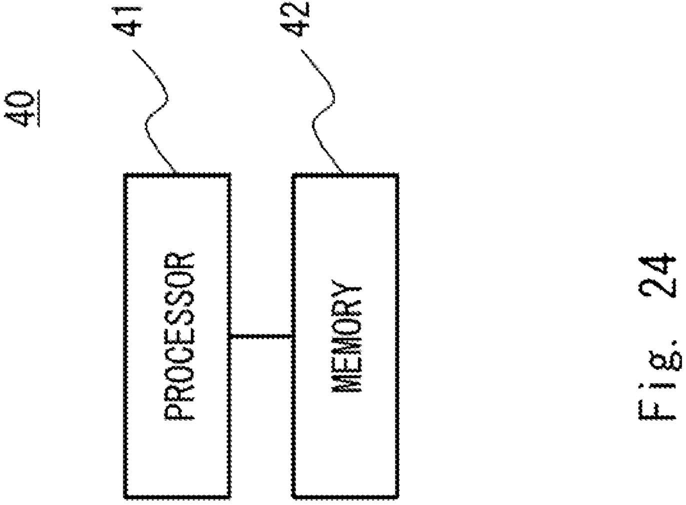
FIG. 24 is a configuration diagram showing a hardware configuration example of a computer according to an example embodiment.

Each component according to the foregoing example embodiments is constituted by hardware or software or both. Each component may be constituted by one piece of hardware or software or by a plurality of pieces of hardware or software. Each device and each function (process) may be implemented by a computer 40 including a processor 41 such as a Central Processing Unit (CPU) and a memory 42 serving as a storage apparatus, as shown in FIG. 24. For example, a program for performing a method (a method in each apparatus) according to the example embodiments may be stored in the memory 42, and each function may be implemented by the processor 41 executing the program stored in the memory 42.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described with reference to the example embodiments, the present application is not limited to the aforementioned example embodiments. Various changes that may be understood by one skilled in the art may be made to the configurations and the details of the present application within the scope of the present application.

The whole or part of the example embodiments disclosed above can be described as, but not limited to, the following supplementary notes.

(Supplementary Note 1)

A signal processing apparatus comprising:

FFT processing means for performing FFT processing overlapping subcarrier signals each other for each of FFT blocks; and generation means for generating a signal obtained by frequency shifting the subcarrier signals that have been subjected to the FFT processing by a frequency shift amount of a subcarrier, a phase offset that occurs between the FFT blocks overlapping each other being compensated in the signal.

(Supplementary Note 2)

The signal processing apparatus according to Supplementary Note 1, wherein the generation means compensates the phase offset that occurs in accordance with a relation between an FFT block size and an overlap size of the FFT processing, and the frequency shift amount.

(Supplementary Note 3)

The signal processing apparatus according to Supplementary Note 1 or 2, wherein the generation means compensates the phase offset when the frequency shift amount is a predetermined amount.

(Supplementary Note 4)

The signal processing apparatus according to Supplementary Note 1 or 2, wherein the generation means compensates the phase offset when the frequency shift amount has changed.

(Supplementary Note 5)

The signal processing apparatus according to any one of Supplementary Notes 1 to 4, wherein the generation means compensates the phase offset for each of the FFT blocks.

(Supplementary Note 6)

The signal processing apparatus according to any one of Supplementary Notes 1 to 5, wherein the generation means comprises:

phase offset computation means for computing the phase offset that occurs in the frequency-shifted signal;

phase compensation means for compensating the computed phase offset for the subcarrier signals that have been subjected to the FFT processing; and frequency shifting means for frequency shifting, by the frequency shift amount, the subcarrier signals where the phase offset has been compensated.

(Supplementary Note 7)

The signal processing apparatus according to any one of Supplementary Notes 1 to 5, wherein the generation means comprises:

frequency shifting means for frequency shifting the subcarrier signals that have been subjected to the FFT processing by the frequency shift amount;

phase offset computation means for computing the phase offset that occurs in the frequency-shifted signal; and phase compensation means for compensating the computed phase offset for the frequency-shifted signal.

(Supplementary Note 8)

The signal processing apparatus according to Supplementary Note 6 or 7, comprising setting means for setting an FFT block size and an overlap size of the FFT processing in such a way that there is a predetermined relation between the FFT block size and the overlap size of the FFT processing, wherein the phase offset computation means computes the phase offset based on the FFT block size and the overlap size that have been set.

(Supplementary Note 9)

The signal processing apparatus according to Supplementary Note 8, wherein the predetermined relation is the overlap size=the FFT block size×½.

(Supplementary Note 10)

The signal processing apparatus according to any one of Supplementary Notes 1 to 5, wherein the generation means comprises:

frequency shift amount computation means for computing the frequency shift amount in such a way that the phase offset of the frequency-shifted signal becomes a predetermined amount; and frequency shifting means for frequency-shifting subcarrier signals that have been subjected to the FFT processing by the computed frequency shift amount.

(Supplementary Note 11)

The signal processing apparatus according to Supplementary Note 10, wherein the frequency shift amount computation means computes the frequency shift amount in such a way that the phase offset does not occur in the frequency-shifted signal based on the FFT block size and the overlap size of the FFT processing.

(Supplementary Note 12)

The signal processing apparatus according to Supplementary Note 10 or 11, wherein the predetermined amount is equal to an integral multiple of 2n.

(Supplementary Note 13)

An optical transmitting apparatus comprising:

signal processing means for processing an input digital signal; and optical transmitting means for optically modulating the processed signal and transmitting the optical signal that has been optically modulated to an optical transmission line, wherein the signal processing means comprises:

FFT processing means for performing FFT processing overlapping subcarrier signals demultiplexed from the digital signal each other for each of FFT blocks; and generation means for generating a subcarrier arrangement signal obtained by frequency shifting the subcarrier signals that have been subjected to the FFT processing by a frequency shift amount of a subcarrier, a phase offset that occurs between the FFT blocks overlapping each other being compensated in the subcarrier arrangement signal.

(Supplementary Note 14)

The optical transmitting apparatus according to Supplementary Note 13, wherein the signal processing means comprises:

demultiplexing means for demultiplexing the subcarrier signal from the digital signal; and IFFT processing means for performing IFFT processing on the subcarrier arrangement signal.

(Supplementary Note 15)

The optical transmitting apparatus according to Supplementary Note 13 or 14, wherein the signal processing means comprises frequency shift amount computation means for computing the frequency shift amount based on transmission line characteristics of the optical transmission line or an error correction result in an optical receiving apparatus reported from the optical receiving apparatus.

(Supplementary Note 16)

An optical receiving apparatus comprising:

optical receiving means for receiving a subcarrier-multiplexed optical signal from an optical transmission line and photodetecting the received optical signal; and signal processing means for converting the photodetected signal into a digital signal and processing the converted digital signal, wherein the signal processing means comprises:

FFT processing means for performing FFT processing overlapping the digital signal each other for each of FFT blocks; and generation means for generating subcarrier demultiplexing signals obtained by frequency shifting subcarrier signals included in the digital signal that has been subjected to the FFT processing by a frequency shift amount of a subcarrier, a phase offset that occurs between FFT blocks overlapping each other being compensated in the subcarrier demultiplexing signals.

(Supplementary Note 17)

The optical receiving apparatus according to Supplementary Note 16, wherein the signal processing means comprises:

IFFT processing means for performing IFFT processing on the subcarrier demultiplexing signals; and multiplexing means for multiplexing the subcarrier demultiplexing signals that have been subjected to the IFFT processing.

(Supplementary Note 18)

The optical receiving apparatus according to Supplementary Note 16 or 17, wherein the signal processing means comprises detection means for detecting transmission line characteristics of the optical transmission line and notifying an optical transmitting apparatus of the detected transmission line characteristics.

(Supplementary Note 19)

The optical receiving apparatus according to any one of Supplementary Notes 16 to 18, comprising error correction means for performing error correction processing on the signal processed by the signal processing means and notifying an optical transmitting apparatus of the result of the error correction.

(Supplementary Note 20)

An optical transmission system comprising:

an optical transmitting apparatus and an optical receiving apparatus connected to each other via an optical transmission line, wherein the optical transmitting apparatus comprises:

signal processing means for processing an input digital signal; and optical transmitting means for optically modulating the processed signal and transmitting the optical signal that has been optically modulated to the optical transmission line, and the signal processing means comprises:

FFT processing means for performing FFT processing overlapping subcarrier signals demultiplexed from the digital signal each other for each of FFT blocks; and generation means for generating a subcarrier arrangement signal obtained by frequency shifting the subcarrier signals that have been subjected to the FFT processing by a frequency shift amount of a subcarrier, a phase offset that occurs between the FFT blocks overlapping each other being compensated in the subcarrier arrangement signal.

(Supplementary Note 21)

The optical transmission system according to Supplementary Note 20, wherein the signal processing means comprises:

demultiplexing means for demultiplexing the subcarrier signal from the digital signal; and IFFT processing means for performing IFFT processing on the subcarrier arrangement signal.

(Supplementary Note 22)

An optical transmission system comprising:

an optical transmitting apparatus and an optical receiving apparatus connected to each other via an optical transmission line, wherein the optical receiving apparatus comprises:

optical receiving means for receiving a subcarrier-multiplexed optical signal from the optical transmission line and photodetecting the received optical signal; and signal processing means for converting the photodetected signal into a digital signal and processing the converted digital signal, and the signal processing means comprises:

FFT processing means for performing FFT processing overlapping the digital signal each other for each of FFT blocks; and generation means for generating subcarrier demultiplexing signals obtained by frequency shifting subcarrier signals included in the digital signal that has been subjected to the FFT processing by a frequency shift amount of a subcarrier, a phase offset that occurs between FFT blocks overlapping each other being compensated in the subcarrier demultiplexing signals.

(Supplementary Note 23)

The optical transmission system according to Supplementary Note 22, wherein the signal processing means comprises:

IFFT processing means for performing IFFT processing on the subcarrier demultiplexing signals; and multiplexing means for multiplexing the subcarrier demultiplexing signals that have been subjected to the IFFT processing.

(Supplementary Note 24)

A signal processing method comprising:

performing FFT processing overlapping subcarrier signals each other for each of FFT blocks; and generating a signal obtained by frequency shifting the subcarrier signals that have been subjected to the FFT processing by a frequency shift amount of a subcarrier, a phase offset that occurs between the FFT blocks overlapping each other being compensated in the signal.

(Supplementary Note 25)

The signal processing method according to Supplementary Note 24, wherein, in the generation, the phase offset that occurs in accordance with a relation between an FFT block size and an overlap size of the FFT processing, and the frequency shift amount is compensated.

REFERENCE SIGNS LIST

1 Optical Transmission System
10 Signal Processing Apparatus
11 FFT Processing Unit
12 Generation Unit
20 Optical Transmitting Apparatus
21 Optical Transmitting Unit
22 Signal Processing Unit
23 FFT Processing Unit
24 Generation Unit
30 Optical Receiving apparatus
31 Optical Receiving Unit
32 Signal Processing Unit
33 FFT Processing Unit
34 Generation Unit
40 Computer
41 Processor
42 Memory
100 Optical Transmitter
110 Transmitter-side DSP
111 Encoding Unit
112 Transmitter-side Digital Signal Processing Unit
113 DAC
120 Optical Transmitting Front End Circuit
121 Laser Light Source
122 Amplifier
123 MZ Modulator
124 Polarization Multiplexing Unit
200 Optical Receiver
210 Receiver-side DSP
211 ADC
212 Receiver-side Digital Signal Processing Unit
213 Error Correction Unit
214 Digital Signal Reproducing Unit
220 Optical Receiving Front End Circuit
221 Laser Light Source
222 Polarization Demultiplexing Unit
223 90-degree Hybrid Circuit
224 Amplifier
300 Optical Fiber Transmission Line
401 Transmitter-side Subcarrier Demultiplexing Unit
402 FFT Unit
403 Transmitter-side Subcarrier Arrangement Unit
404 IFFT Unit
405 Frequency Shift Setting Unit
406 FFT Parameter Acquisition Unit
407 Phase Offset Computation Unit
408 Phase Compensation Unit
409 FFT Parameter Setting Unit
410 Subcarrier Spacing Adjustment Unit
501 FFT Unit
502 Receiver-side Subcarrier Demultiplexing Unit
503 IFFT Unit
504 Receiver-side Subcarrier Multiplexing Unit
505 Frequency Shift Setting Unit
506 FFT Parameter Acquisition Unit
507 Phase Offset Computation Unit
508 Phase Compensation Unit
509 FFT Parameter Setting Unit

What is claimed is:

1. A signal processing apparatus comprising:

a processor performing Fast Fourier Transform (FFT) processing of overlapping subcarrier signals for each of FFT blocks; and a generator generating a signal obtained by frequency shifting the subcarrier signals that have been subjected to the FFT processing by a frequency shift amount of a subcarrier, a phase offset that occurs between the FFT blocks overlapping each other being compensated in the signal, wherein the generator computes the phase offset that occurs in the frequency-shifted signal, compensates the computed phase offset for the subcarrier signals that have been subjected to the FFT processing, and frequency shifts, by the frequency shift amount, the subcarrier signals where the phase offset has been compensated.

2. The signal processing apparatus according to claim 1, wherein the generator compensates the phase offset that occurs in accordance with a relation between an FFT block size and an overlap size of the FFT processing, and the frequency shift amount.

3. The signal processing apparatus according to claim 1, wherein the generator compensates the phase offset when the frequency shift amount is a predetermined amount.

4. The signal processing apparatus according to claim 1, wherein the generator compensates the phase offset when the frequency shift amount has changed.

5. The signal processing apparatus according to claim 1, wherein the generator compensates the phase offset for each of the FFT blocks.

6. The signal processing apparatus according to claim 1, wherein the generator frequency shifts the subcarrier signals that have been subjected to the FFT processing by the frequency shift amount, computes the phase offset that occurs in the frequency-shifted signal, and compensates the computed phase offset for the frequency-shifted signal.

7. The signal processing apparatus according to claim 1, an FFT block size and an overlap size of the FFT processing are set in such a way that there is a predetermined relation between the FFT block size and the overlap size of the FFT processing, wherein the generator computes the phase offset based on the FFT block size and the overlap size that have been set.

8. The signal processing apparatus according to claim 7, wherein the predetermined relation is the overlap size=the FFT block size×½.

9. The signal processing apparatus according to claim 1, wherein the generator computes the frequency shift amount in such a way that the phase offset of the frequency-shifted signal becomes a predetermined amount, and frequency shifts subcarrier signals that have been subjected to the FFT processing by the computed frequency shift amount.

10. The signal processing apparatus according to claim 9, wherein the generator computes the frequency shift amount in such a way that the phase offset does not occur in the frequency-shifted signal based on the FFT block size and the overlap size of the FFT processing.

11. The signal processing apparatus according to claim 9, wherein the predetermined amount is equal to an integral multiple of 2π.

12. An optical transmitting apparatus comprising:

a signal processor processing an input digital signal; and an optical transmitter optically modulating the processed signal and transmitting the optical signal that has been optically modulated to an optical transmission line, wherein the signal processor performs Fast Fourier Transform (FFT) processing of overlapping subcarrier signals demultiplexed from the digital signal for each of FFT blocks, and generates a subcarrier arrangement signal obtained by frequency shifting the subcarrier signals that have been subjected to the FFT processing by a frequency shift amount of a subcarrier, a phase offset that occurs between the FFT blocks overlapping each other being compensated in the subcarrier arrangement signal.

13. The optical transmitting apparatus according to claim 12, wherein the signal processor demultiplexes the subcarrier signal from the digital signal, and performs Inverse Fast Fourier Transform (IFFT) processing on the subcarrier arrangement signal.

14. The optical transmitting apparatus according to claim 12, wherein the signal processor computes the frequency shift amount based on transmission line characteristics of the optical transmission line or an error correction result in an optical receiving apparatus reported from the optical receiving apparatus.

15. An optical receiving apparatus comprising:

an optical receiver receiving a subcarrier-multiplexed optical signal from an optical transmission line and photodetecting the received optical signal; and a signal processor converting the photodetected signal into a digital signal and processing the converted digital signal, wherein the signal processor performs Fast Fourier Transform (FFT) processing of overlapping digital signals for each of FFT blocks, and generates subcarrier demultiplexing signals obtained by frequency shifting subcarrier signals included in the digital signal that has been subjected to the FFT processing by a frequency shift amount of a subcarrier, a phase offset that occurs between FFT blocks overlapping each other being compensated in the subcarrier demultiplexing signals, wherein the signal processor performs Inverse Fast Fourier Transform (IFFT) processing on the subcarrier demultiplexing signals, and multiplexes the subcarrier demultiplexing signals that have been subjected to the IFFT processing.

16. The optical receiving apparatus according to claim 15, wherein the signal processor detects transmission line characteristics of the optical transmission line and notifies an optical transmitting apparatus of the detected transmission line characteristics.

17. The optical receiving apparatus according to claim 15, comprising an error corrector performing error correction processing on the signal processed by the signal processor and notifying an optical transmitting apparatus of the result of the error correction.

* * * * *